C. F. PYM.
LASTING MACHINE.
APPLICATION FILED DEC. 13, 1915.

1,368,968.

Patented Feb. 15, 1921.
9 SHEETS—SHEET 1.

Witnesses

Inventor
Charles F. Pym,
By
Attorneys

C. F. PYM.
LASTING MACHINE.
APPLICATION FILED DEC. 13, 1915.
1,368,968.
Patented Feb. 15, 1921.
9 SHEETS—SHEET 5.
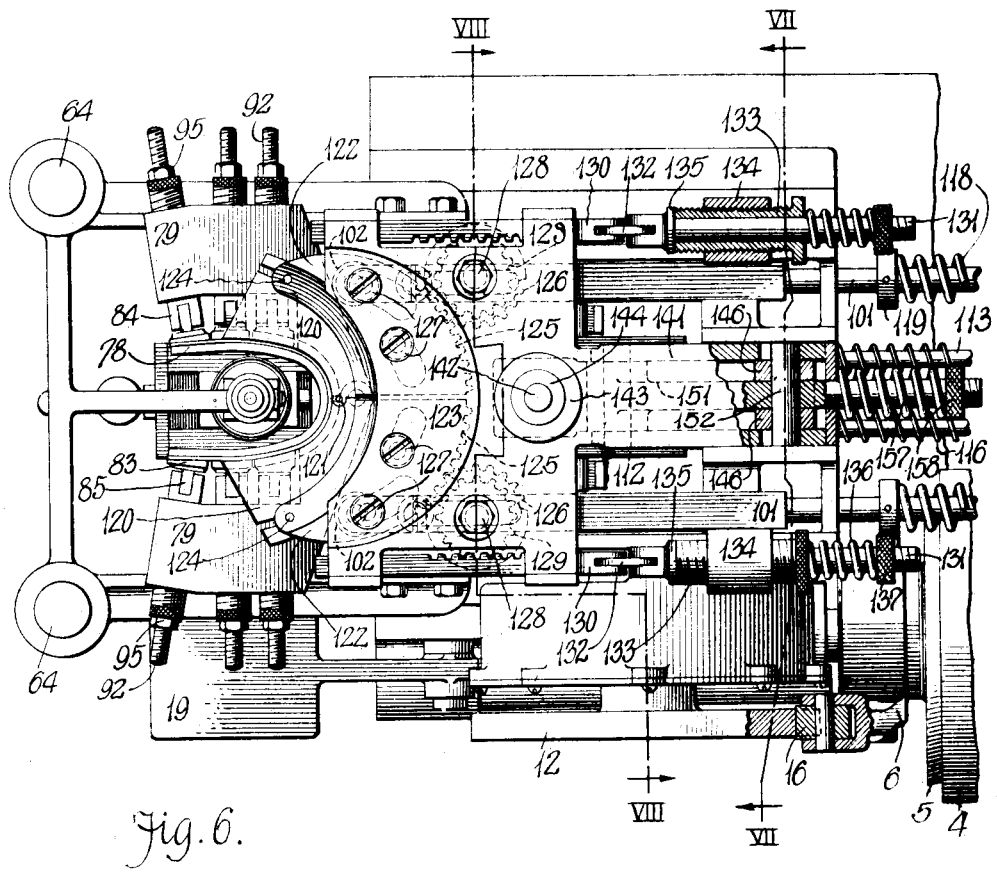
Fig. 6.
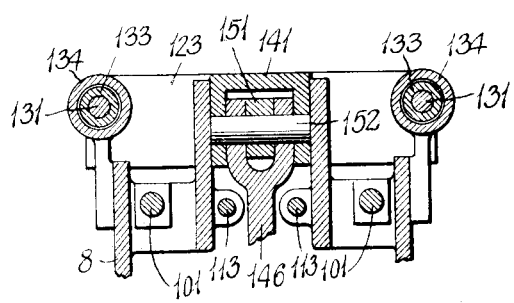
Fig. 7.
Witnesses
Chas W. Stauffer
Anna M. Dorr
Inventor
Charles F. Pym.
By 
Attorneys

C. F. PYM.
LASTING MACHINE.
APPLICATION FILED DEC. 13, 1915.

1,368,968.

Patented Feb. 15, 1921.
9 SHEETS—SHEET 6.

Witnesses
Chas W. Stauffiger
Anna M. Dorr.

Inventor
Charles F. Pym,
By
Attorneys

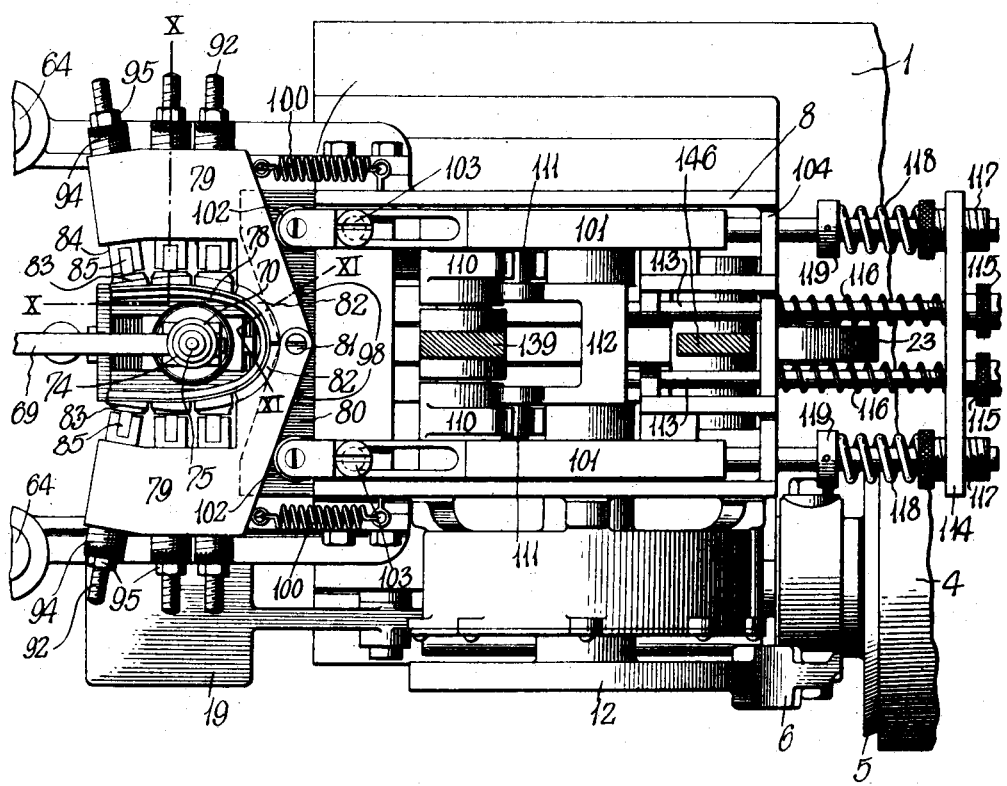
Fig. 9.
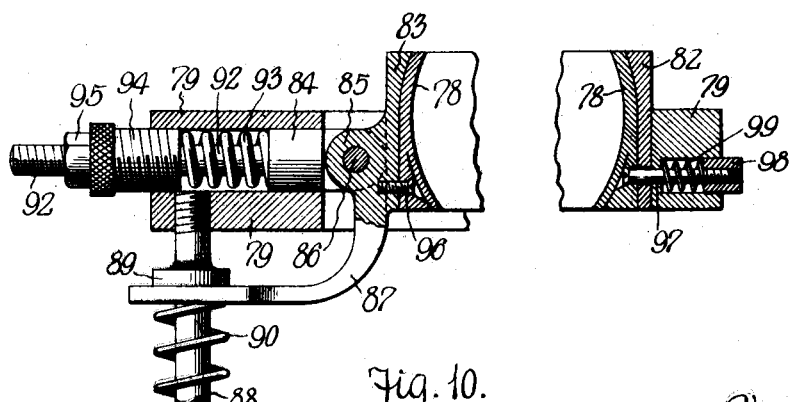
Fig. 10.
Fig. 11.

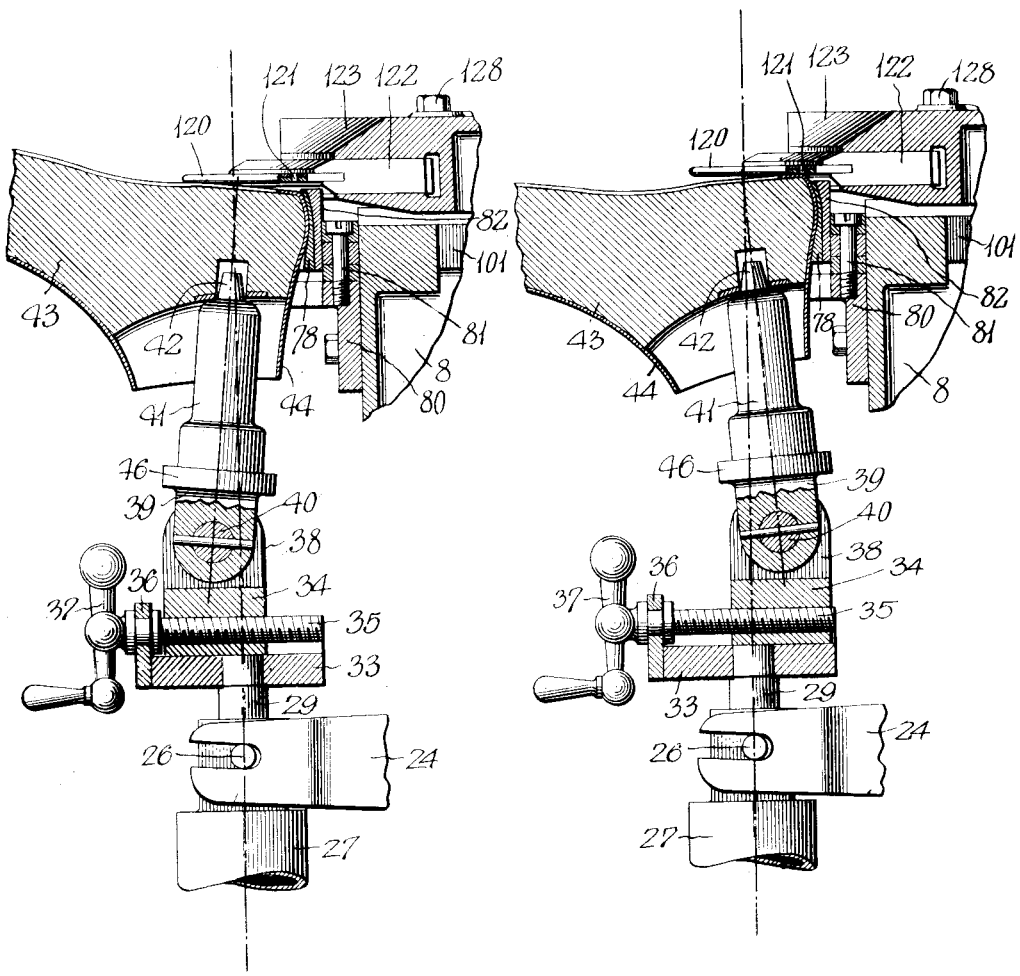

C. F. PYM.
LASTING MACHINE.
APPLICATION FILED DEC. 13, 1915.
1,368,968.
Patented Feb. 15, 1921.
9 SHEETS—SHEET 9.
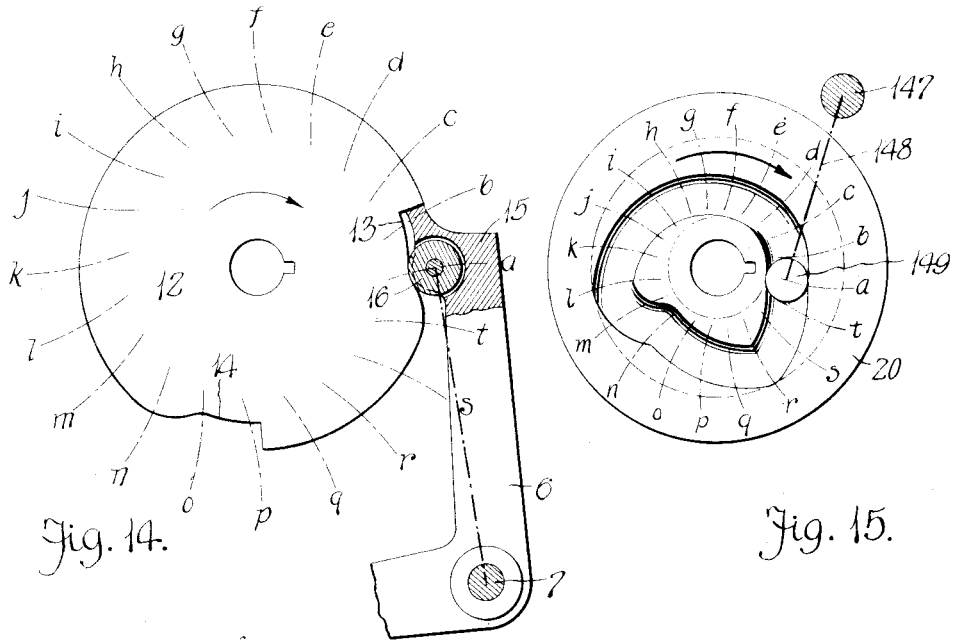
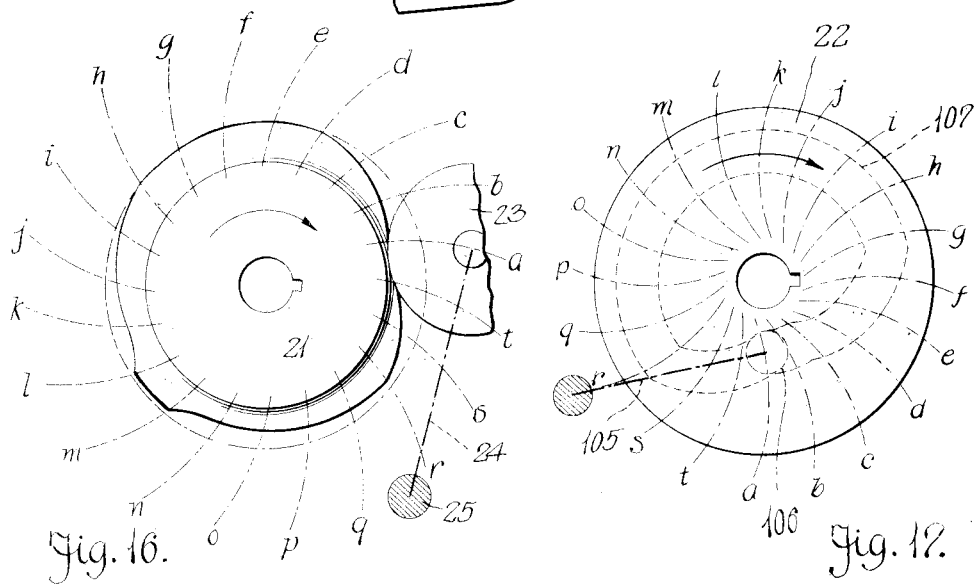
Witnesses
Chas. W. Stauffiger
Anna M. Doll
Inventor
Charles F. Pym,
By
Attorneys

UNITED STATES PATENT OFFICE.

CHARLES F. PYM, OF DETROIT, MICHIGAN, ASSIGNOR, BY MESNE ASSIGNMENTS, TO UNITED SHOE MACHINERY CORPORATION, OF PATERSON, NEW JERSEY, A CORPORATION OF NEW JERSEY.

LASTING-MACHINE.

1,368,968.   Specification of Letters Patent.   Patented Feb. 15, 1921.

Application filed December 13, 1915.   Serial No. 66,486.

*To all whom it may concern:*

Be it known that I, CHARLES F. PYM, a subject of the King of England, residing at Detroit, in the county of Wayne and State of Michigan, have invented certain new and useful Improvements in Lasting-Machines, of which the following is a specification, reference being had therein to the accompanying drawings.

This invention relates to machines for shaping the uppers of boots or shoes and more particularly, in some of its aspects, to that type of machine in which means are provided for clamping and conforming the shoe upper materials to the sides of a form, for example, the shoe last, at one end of the last and for wiping the upstanding edge of the clamped upper at that end of the last over the bottom of the last and compacting it over the sole or insole mounted over the last bottom.

The vertical and longitudinal contours of the sides of lasts will vary at their ends with rights and lefts of the same pattern, and with different patterns of lasts. Consequently, if the upper is to be correctly conformed to the contour of the sides of the last, the clamping or conforming means must be capable of adaptation to these varying contours. This variance is particularly noticeable at the opposite sides of the heel end of the last, the inner side face of which is noticeably undercut in contrast to the rounded outer side face.

In one aspect of the invention, a novel feature resides in improved end clamping means the construction shown comprising a flexible end embracing band for conforming a boot or shoe upper to one end of its last, and means for forcing said band into last-conforming contact with the shoe upper including a series of pressure members acting against each side of the band and arranged independently to yield responsively to pressure against the band and last in directions automatically to adjust themselves to cause the band to press and conform the upper to the longitudinal and vertical contours of the sides of the last, a common carrier for each series of pressure members, and means for moving said carriers in directions to cause said members to press the upper into conformity with the last. Preferably, these pressure members form a substantially continuous surface to engage the flexible member at opposite sides of the longitudinal median line of the last and shoe. Further, in order that they may conform to the vertical as well as the lengthwise contour of the last, these pressure members are mounted to rock against yielding resistance about axes extending lengthwise of the last for adjustment transversely of the flexible member. Preferably, the pressure members extend across substantially the full width of the illustrated flexible member. The independent bodily movement of the pressure members in directions toward and from the last permits automatic conformation of the members to the lengthwise contour of the sides of the last while the pivotal mounting of these members permits them automatically to conform to the vertical contour of the last sides so that when pressure is applied to the pressure members the flexible member closely conforms the shoe upper to the sides of the last. In some of its aspects, moreover, the invention presents novelty in the clamping means irrespective of the use of a flexible end embracing member.

In conforming the shoe upper to the last, it is difficult to obliterate through closing pressure, only, of the end embracing means, the wrinkles and inequalities on the face of the shoe upper at the end of the shoe in and about the longitudinal median line of the shoe. A further feature of this invention consists in novel means effective to achieve this result, the construction shown comprising a last support and an opposed member relatively movable to clamp a last between them, with means operated by said relative movement to force the last and shoe upper lengthwise into upper conforming contact with an end embracing means at the end of the last. Preferably, the contact is yieldingly effected and means are also provided to hold the last and shoe in such conforming contact under yielding pressure. The described combinations provide means which will conform the upper materials with precision to the end face of the last, and will clamp the shoe and last against movement relatively to its support so that the smoothing out or conforming pressure is maintained for a sufficient period to make it effective.

A further novel and advantageous feature of the invention consists in opposed members at the top and bottom of a last, respectively connected for simultaneous movement toward each other to clamp the last between them and also connected for simultaneous movement in opposite directions from each other. The connection of these opposed members for simultaneous movement requires but one actuating mechanism and greatly simplifies the timing operation in an automatic lasting mechanism. Further advantage is secured by providing one of these opposed members with a yielding element. This enables the yielding element to be depressed by the non-yielding member, for example to relieve pressure of the yielding element against lasting wipers, and enables reverse movement of the non-yielding member to permit the pressure of the yielding element to operate against lasting means engaged with the marginal portion of a shoe upper over the bottom of the last. Advantageously also, a portion of one of the opposed members, for example, the last supporting member, is pivoted to permit the previously described longitudinal movement of the last in the direction of embracing and conforming means for the upper at the end of the last.

Another important portion of this invention deals with the efficient conformation of the marginal portion of the upper to the edge and the bottom face of the form or last, or of the insole thereon. The margin of the upper, which is presented as an upstanding flange around the end of the shoe, is to be gathered inwardly and compacted to form a seat upon which to lay the outsole and should be molded at the extreme edge of the shoe bottom to present a well defined and permanent edge line and, after the outsole is attached, one wall of a clear straight rand or welt crease. This edge formation has been most difficult to obtain and render permanent, as may be appreciated when it is remembered that the gathering of the flange over the heel seat end of the insole, for example, produces fullness in the form of plaits that increase the effective thickness of the upper stock under the wipers as the wipers advance inwardly over the shoe bottom. It has been necessary, in order to prevent the wipers from shearing off the upper as they advance, to adjust wipers and last supports relatively in such planes that relatively light and ineffective pressure was produced on the low surface at the edge of the heel seat and effective pressure was applied only on the portion of the overwiped flange remote from the edge. I have dealt with this condition in two ways each of which is broadly new in the art as I am advised. One of these important features of this invention comprises novel means for positioning and effecting relative movement of end lasting wipers and a shoe to cause the wipers to wipe the upper smoothly and firmly across the edge of the shoe bottom prior to their wiping action over the shoe bottom, this feature in the construction shown being embodied in what may be termed "climbing" wipers which engage the lateral periphery of the shoe with the plane of their wiping faces slightly displaced from the plane of the work at the edge of the shoe bottom and are forced by wedging action of the shoe to climb or ride over the edge of the embraced shoe end in hard frictional contact with the upper and against the resistance of a stiff spring or its equivalent. The organization contemplated by me under this invention, and one example of which is herein fully described, provides for applying around the end of a shoe, for the first time so far as I am aware, heavy wiping or ironing down pressure to the upper being overwiped at the extreme edge of the shoe end, and continuing substantially the same pressure as the wipers advance over the thicker upper materials encountered as they move inwardly from the shoe edge. Preferably the extent of possible yield of the wipers upwardly in order to climb over the edge of the shoe is narrowly limited so that the wipers become unyielding against upward displacement during their inwiping movement. It is an important characteristic of a wiper mechanism organized as described that it is possible to make the wipers frictionally pull the upper tightly over the edge of the insole and insure very snug fitting of the upper around the edge of the insole, for example at the heel seat. This feature of climbing wipers is of particular importance in automatic end lasting or end shaping machinery in which an operator's judgment is not largely available and I intend to limit some claims to an automatic shoe shaping machine characterized by this feature of invention.

It is usually desirable, in order to obtain permanence of shaping of the upper materials over the bottom of a last end, to repeat the wiping operation, under some conditions a number of times, to break down and set the overwiped flange in its new position. A feature of this invention consists in the combination with a climbing wiper of mechanism organized to reciprocate the wiper repeatedly without backing it fully off, or across the shoe edge. My experience indicates that the advantageous effect of a climbing wiper, particularly in an automatic machine, is not enhanced by causing it to repeat its action on the shoe edge.

The second way above referred to in which I have dealt with the conditions presented by the increasing thickness of gathered upper materials as the wipers progress over the shoe bottom is automatically to change the pressure as the wipers advance. In accordance with the illustrated embodiment of this feature of the invention the last is sustained by means including a very stiff spring, and a holddown, by which the plane of the heel seat is determined relatively to the wipers, is operated to hold the shoe depressed to an initial wiping level at which the heavy sustaining spring is compressed and is caused to rise after the wipers have started inwardly over the heel seat, thereby allowing the heavy spring to press the shoe upwardly with its full strength against the advancing wipers. This organization, by which the pressure is changed automatically during the advance of the wiper, produces the most effective compacting and permanent setting of the overwiped upper materials of which I am aware. The effectiveness of wiping is enhanced, as is well known, by relieving the pressure to prevent drag of the wipers during back strokes, and I preferably connect the holddown with automatic means operating in timed relation with the wipers to depress the shoe or last slightly before the wipers start back and to allow the heavy spring to uplift the shoe or last at a definite point in the advance of the wipers. It is, of course, understood that while the climbing wipers and the shoe moving means are advantageously used together they are not limited to such use.

In operating upon different sizes and shapes of lasts and shoes, it is necessary to adjust the last and shoe supporting means relatively to the upper conforming means and to the wipers so as to present the insole to the wipers in the plane to secure the most effective wiping down pressure by the wipers against the edge of the upper and insole. The last holes into which the supporting last spindle extends are not in uniform angular relation to the heel seats, and the last holes in different sizes of lasts are at different distances from the ends of the lasts; and means for adjustment are necessary to meet these conditions so as to place the sole in the most effective plane relatively to the wipers.

A further feature of the invention consists in novel means for supporting a last in lasting position relatively to the end lasting wipers, the construction shown comprising a member guided for movement toward the wipers and having a last spindle mounted thereon for bodily adjustment relatively thereto lengthwise of the last. Additionally, said member is preferably guided for movement toward and from the wipers in approximately the vertical axis of the last hole, and the last spindle is mounted for bodily right line adjustment on said member lengthwise of the last and comprises a base and a last pin pivoted on the base to tip lengthwise of the last.

Means for bodily lengthwise adjustment of the last pin enables the operator to provide for the differences in distance from the last holes to the ends of lasts; and this adjustment means in coöperation with other means for tilting adjustment of the last pin lengthwise of the last permits the operator to adjust and position the insole in the proper plane for effective wiping down pressure under varying angular relations of the last holes to the plane of the sole and under varying linear relations of the last holes to the ends of the lasts and constitutes a feature of the invention.

In making such adjustments, the last pin in the construction shown may be moved forwardly or backwardly with relation to the supporting member or rod, depending upon the size of the last and the angle of the last hole relatively to the plane of the insole, to locate the pivot of the last pin so that the pin will automatically tip backwardly in the holes of lasts of different sizes and last hole locations and angles in response to upward pressure of the last against the wipers. This condition may be obtained by locating the pivot of the last pin forwardly of the supporting rod with the rod approximately in alinement with the last hole. Vertical movement of the support and holddown to clamp the last and sole between them, or vertical movement or pressure of the last against the wipers when projected over the bottom of the last will therefore tip the last pin backwardly in the last holes of the different lasts and press the end of the last hard against the clamping band.

When the upper materials are stiff and relatively heavy, positive power-effected forward closing movement of the wipers over the heel seat may damage the upper or strain operating parts of the machine. To avoid such consequences, and to improve in general the operation of overlaying means upon a shoe, a further feature of the invention consists in novel controlling and operating mechanism for overlaying means, the illustrative construction comprising novel mechanism to move the wipers yieldingly forward over the heel seat combined with means arranged to permit said wipers to yield upwardly in response to pressure of the shoe materials, this arrangement in the construction shown also permitting the wipers to climb up over the edge of the heel seat as hereinbefore explained. Preferably, the wipers are yieldingly closed over the heel seat as they bodily and yieldingly move lengthwise of the last toward and over the heel seat.

Despite arrangements for adjusting the last and shoe in coöperative relation to the path of bodily wiper movements, the operator will sometimes neglect to avail himself of the adjustments provided and consequently the end of the shoe will be presented at an angle to this path of bodily movement so that the wipers may not always be positioned to conform to the end of the last. To remedy this and other conditions of abnormal resistance to closing movement of a wiper or wipers, a feature of this invention comprises a wiper construction having novel means affording provision for yield in response to resistance to such closing movement, the construction shown embodying pivoted wiper plates supported in carriers mounted for independent wiper closing and opening movements about the pivot of said wipers as a center, the wiper operating means including independent connections to these carriers constructed to yield in response to abnormal resistance to permit automatic relative adjustment of the wipers to the contour and position of the shoe. In the illustrative construction, wherein the wiper closing movements are effected by pinions that move bodily forward with the wipers and are operated by relatively stationary rack bars, provision is afforded for yield of the rack bars each independently of the other when abnormal resistance is encountered by the respective wipers to permit one or both of the wipers to continue its forward movement without corresponding closing movement or to be wedged laterally outward by resistance of the shoe materials.

The described and other features of the invention, including certain novel operating means for clamping the last in position and for operating the end wipers, are more fully described in the following detailed specification read in connection with the accompanying drawings, and in which:

Fig. 6 is a top plan view of the mechanism shown in Fig. 3, with the last and shoe removed and with parts at the rear of the machine broken away to disclose operating mechanisms;

Fig. 7 is a fragmentary transverse section taken on the line VII—VII of Fig. 6;

Fig. 9 is a top plan view of the mechanism shown in Fig. 3, the wiper plates and wiper-carrying head being removed;

Fig. 10 is a fragmentary transverse section taken on the line X—X of Fig. 9;

Fig. 11 is a fragmentary transverse section taken on the line XI—XI of Fig. 9;

Fig. 12 is a vertical sectional view of the last supporting means in one position of adjustment relatively to the clamping band and wiper plates;

Fig. 13 is a view similar to Fig. 12 with the last supporting means in a different position of adjustment;

Fig. 14 is a view in elevation, partly in section, of the motion arresting disk and its operated part;

Fig. 15 is a plotted detail of the wiper-head operating cam;

Fig. 16 is a plotted detail of the last jack and holddown operating cam; and

Fig. 17 is a plotted detail of the cam for operating the clamping band.

Figures 1, 2:
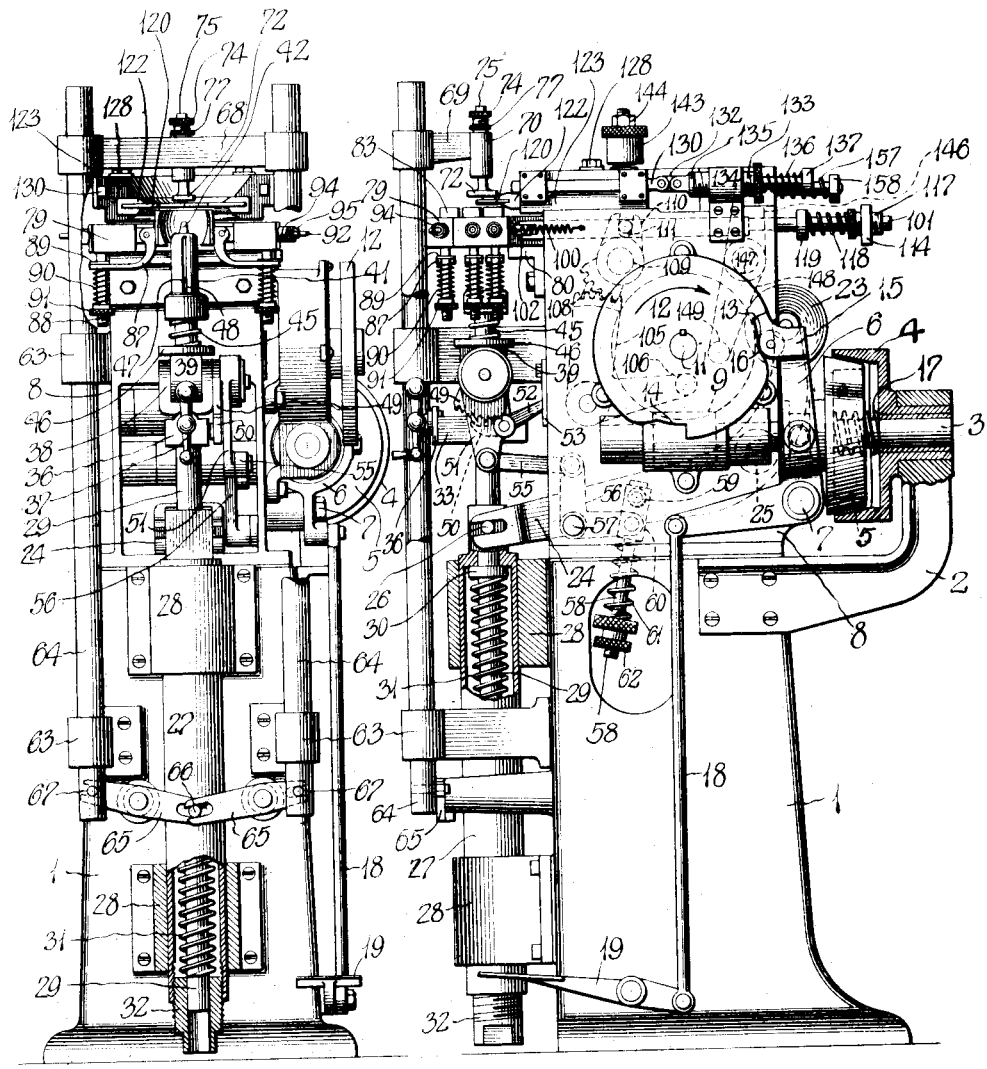
Figure 1 is a front elevation of a machine embodying the present invention, with parts broken away and in section for clarity of illustration.
Fig. 2 is a side elevation of the machine, parts being similarly broken away and in section.

From a suitably formed base, a column 1 rises upwardly and is crowned by a frame 8 housing part of the operating mechanism. At the top of the column at its rear, a bracket 2 extends rearwardly and upwardly forming a bearing in which is journaled the rear end of a worm shaft 3, and the hub of a power driven pulley 4, loosely sleeved on the shaft. The pulley is cupped to form the cup member of a cone clutch, the cone member 5 of which is sleeved on the shaft 3 for free longitudinal sliding movement and has its sleeve portion formed with the usual annular groove to receive the pins and rolls projecting inwardly from the bifurcated upper arm 6 of a bell-crank clutch shifting lever pivoted to the frame 8 at 7.

Figure 8:
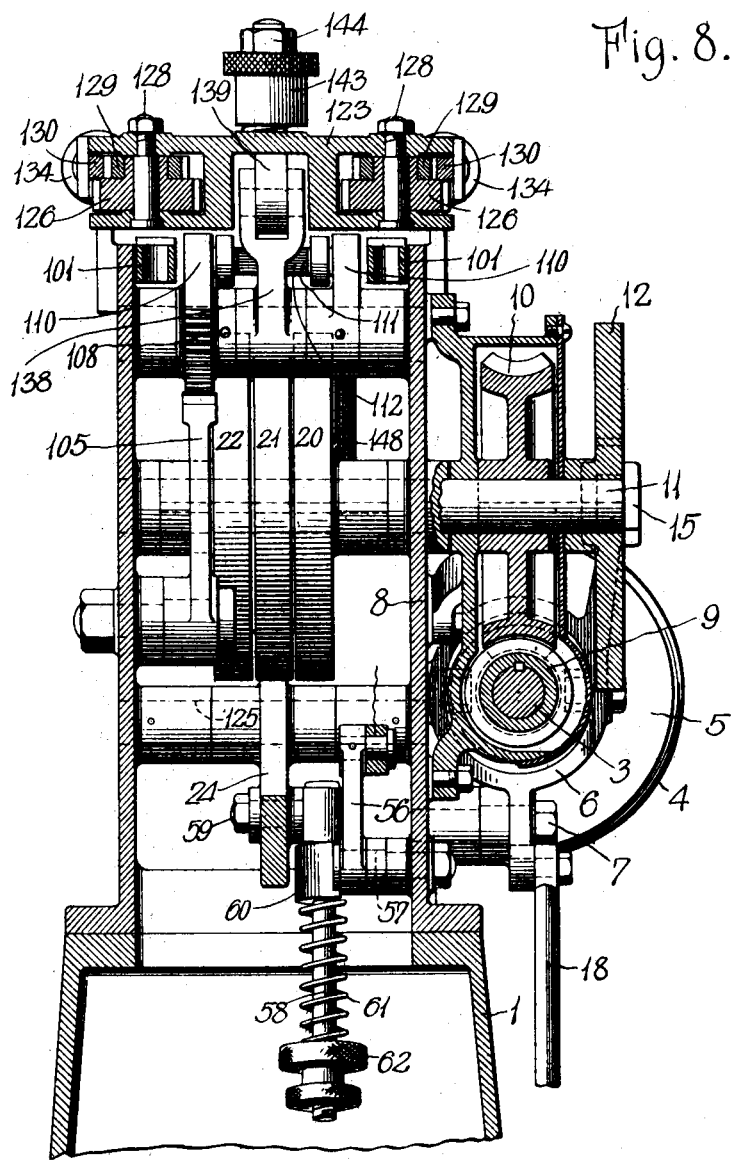
Fig. 8 is a transverse vertical section taken on the line VIII—VIII of Figs. 3 and 6.

Forwardly of the clutch cone and shifting lever, the shaft carries and rotates a worm 9 (Fig. 8) engaging with a worm gear 10 carried by a driven cam shaft 11 journaled in and extending transversely of the frame 8 and having one end projecting outwardly beyond the side of the frame. The worm gear is mounted on this projected portion of the shaft and with the worm 9 is preferably protected from dust and dirt by a suitable inclosing housing (Fig. 8). The extremity of the projected portion of the shaft 11 extends beyond this housing and carries a motion arresting or stop disk 12, having spaced notches 13 and 14 in its periphery forming stop shoulders to be engaged by the end of an arm 15 at the upper end of one of the bifurcations 6, this arm carrying a roller 16 to ride upon the periphery of the disk.

A coiled spring 17 sleeved on the shaft 3 between the two members of the cone clutch operates normally to move the cone member 5 out of clutching engagement with pulley 4 and to position its arm 15 to arrest rotation of the cam shaft 11 when the disk 12 is positioned to permit the arm 15 to enter into one of the notches 13, 14 under the impulse of the spring which normally presses the roller 16 against the periphery of the disk. The arm 15 is moved out of the disk notch and the clutch thrown in to start or restart the rotation of the cam shaft and the operation of the machine, by means of a rod 18 pivoted at its upper end to the lower arm of the clutch shifting bell crank lever and pivoted at its lower end to a treadle 19 at the base of the column 1. When the clutch is moved and shaft 11 begins to rotate, the roller 16 on arm 15 rides upon the periphery of the disk and holds the cone member 5 in clutching position until the next notch in the disk periphery permits the spring 17 to force the arm 15 into the notch and coincidently to retract the clutch member 5.

The shaft 11, between the walls of the frame 8 carries three disks 20, 21 and 22, effective respectively to control and operate in timed relation the wipers, the last jack and holddown, and the clamping band. The disks 20 and 22 have grooved cam faces and the disk 21, controlling the last jack and holddown, has its peripheral face formed as a cam surface against which bears a roller 23 carried at the rear end of a lever 24 pivotally mounted at 25 on the frame 8 adjacent to its rear end and having slotted bifurcations at its forward end, embracing pins 26 outstanding laterally from the head of a cylinder 27 mounted for vertical sliding movement in guides 28 attached to the front of the column.

Figure 5:
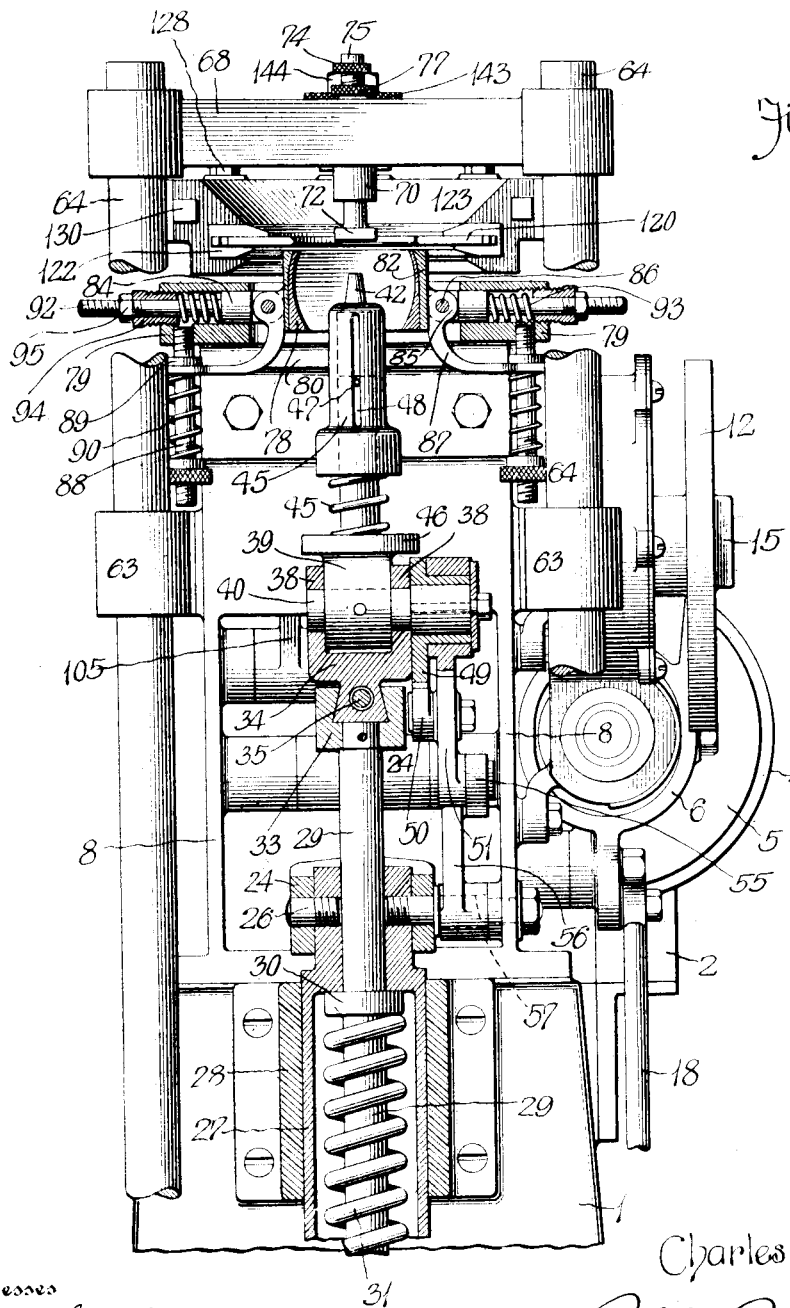
Fig. 5 is a front elevation of the upper part of the machine on an enlarged scale, with certain of the parts broken away and other parts shown in section.

A rod 29 extends axially through the cylinder, its lower end being guided in the bore formed in a screw plug 32 closing the lower end of the cylinder and its upper end extending through and beyond the head of the cylinder. A coiled spring 31 is sleeved on the rod within the cylinder 27 with its lower end abutting the screw plug 32 and its upper end acting against a stop collar 30 formed on the rod, and normally tends to move the rod upwardly until the collar 30 engages the head of the cylinder (Fig. 5). The spring 31 acts as a yielding connection between the cylinder 27 and the rod 29 when lever 24 is moved to lift the cylinder and also permits the rod 29 to yield downwardly relatively to the cylinder in response to downward pressure on the rod greater than the strength of the spring.

The upper end of the rod 29 is shouldered down to receive a block 33 which is fixedly attached thereto and which has its upper face provided with a dove-tailed groove therein extending lengthwise of the machine. A similarly shaped rib depending from a superposed block 34 is seated in this groove and is adjustable with the block 34 transversely of the rod 29 lengthwise of the machine by means of a threaded adjusting spindle 35 engaging a threaded bore in the depending rib of block 34 and held against bodily longitudinal movement by a plate 36 held between collars on the adjusting rod and attached to the front edge face of the lower block 33. Preferably, a handle 37 is provided for turning the spindle to adjust the position of the block 34 relatively to the longitudinal axis of the rod 29 and lengthwise of the machine.

The adjustable block 34 is formed with bifurcated upstanding ears 38, in which the lower and enlarged end of a spindle 39 is mounted, the pivot pin 40 to which the lower end of this spindle is secured being journaled between said upstanding ears to permit swinging movement of said spindle in a direction longitudinally of the machine and of a last supported by said spindle, as will be seen. Above its base, the spindle 39 is formed with a collar 46 forming an abutment against which seats the lower end of the coiled spring 45 sleeved on the spindle and engaging at its upper end with a sleeve 41 sliding upon the spindle 39 and having its lower end enlarged to form a housing for the spring 45. This sleeve has its upper end closed and reduced in diameter to form a nib 42 acting as a last pin to engage in the hole or thimble of the last to support the last. This sleeve is loosely held upon the spindle 39 and is guided to slide longitudinally thereon by a pin 47 extending laterally from the sides of the spindle 39 and in alined vertical guide slots 48 in the sleeve 41.

The pivot pin 40 of the spindle is extended beyond the ears 38 at one side of the block 34 and enlarged in diameter to receive the hub of a depending ratchet plate 49. This hub is rigidly connected to the pin and has loosely sleeved thereon the upper end of an arm 51 carrying on one side a pivoted dog or pawl 50 positioned to engage the ratchet plate 49 to lock the pin 40 and the last spindle against forward swinging movement. This dog 50 has a tail 52 extending through and guided by a vertical slot formed in a plate 53 depending from the front of the frame. A coiled spring 54 normally tends to swing the forward end of the dog 50 into engagement with the ratchet 49. In the lowered position of rod 29, the tail of the dog engages the plate 53 at the lower end of the slot and swings the forward end 50 of the dog out of engagement with the ratchet 49, permitting the last spindle 39 to be swung forwardly with its last. When the rod 29 is raised to clamp the last with its shoe upper, as will be later explained, the tail of the dog will be moved clear of the lower end of the notch and the forward end of the dog 50 will coöperate with the ratchet 49 to hold the last spindle against forward swinging movement.

The last spindle is arranged to be swung rearwardly on its pivot 40 coincidently with the raising of the last supporting rod 29 and through the actuation of the means for so raising the rod. The lower end of the arm 51 which carries the dog 50, is pivotally connected by link 55 to the upper end of a bell crank lever 56 pivotally mounted on a pin 57 projecting from the side of the frame 8. This lever has its rear end pivoted to a block 60 slidably mounted upon a rod 58 having an enlarged upper end pivotally connected at 59, to the cam actuated lever 24. A coiled spring 61 is sleeved upon the rod 58 below the block 60 and engages said block and an adjusting nut 62 on the lower end of the rod. Upward movement of the forward end of lever 24 to lift the last supporting rod 29, will, through the yielding connections afforded by rod 58, spring 61 and bell crank lever 56, tend to rock, the arm 51 in a direction to cause the dog 50 to swing the engaged ratchet and the last supporting spindle 39 rearwardly of the machine and in a direction toward the heel end of a last supported upon the spindle. If opposition to this rearward movement of the last spindle is encountered which is greater than the force of the spring 61, the rod 29 will be moved upwardly without any rearward swinging movement of the last spindle, the rod 58 sliding upwardly through the block 60 and compressing the spring 61.

At opposite sides of the front of the machine bearing brackets 63 are secured to the column 1 and to the frame 8 in vertical alinement. Complemental bars 64 are guided in these bearings and are connected for simultaneous upward and downward movement by pivoted links 65, whose adjacent ends overlap and are slotted conjointly to embrace pin 66 laterally outstanding from the cylinder 27. The outer ends of these links are also slotted and engage outstanding pins 67 at the lower ends of the bars 64. Upward movement of the cylinder 27 through the cam actuated movement of the lever 24 will effect through these connections, simultaneous movement of the bars 64 in the opposite direction—*i. e.*—when the cylinder moves upwardly the bars move downwardly and vice versa.

The upper ends of the bars 64 are bridged by a cross piece 68 having a centrally disposed and rearwardly extending arm 69 which is formed at its rear end with a vertical bore 70 threaded at its upper end to receive a threaded sleeve 74. The reduced upper end of the shank portion of a rod 71, having its lower and enlarged portion terminating in a holddown member or foot 72, extends upwardly through the sleeve and is maintained in determinate relation thereto by a collar 75 which rests on the flanged upper end of the sleeve. The reduction in the diameter of the rod 71 provides a shoulder 73 which is maintained against the lower end of the sleeve 74 by the collar 75. Obviously the holddown may be adjusted vertically by turning sleeve 74. To prevent turning movement of the holddown a longitudinal slot is provided in the lower enlarged portion of the rod 71, and a pin 76 engaging in this slot prevents such rotation. Preferably, a lock nut 77 is employed in conjunction with sleeve 74 to fix it in adjusted position. The holddown 72 is preferably positioned substantially in vertical axial alinement with the rod 29 to engage the sole or insole on a last seated on the last pin 42 to clamp the last between it and the last supporting means when said means with the last is raised and a corresponding downward movement is imparted to the holddown through the medium of the bars 64 and links 65. It is evident that the cylinder 27, rod 29, and spindle 39 with its sleeve 41, form a jack to support the last in position for lasting, and that by means of the block 34 the spindle may be adjusted forwardly or rearwardly relatively to the vertical axis of the rod to cause it in operation to assume different positions about the axis of the pivot pin 40 to incline the bottom of the last and shoe sole at varying angles to the lasting devices, as illustrated by Figs. 12 and 13. As suggested also by Fig. 12, the block 34 may be so adjusted as to cause the last pin or spindle to incline rearwardly toward the heel band when the shoe is in position for the operation of the wipers, thus rendering the downward pressure of the wipers on the heel seat effective with a tendency to tip the spindle and the shoe still farther rearwardly and assisting in seating the shoe firmly against the rear end portion of the band during the lasting operation.

The inverted last when mounted on the last pin 42 of the last spindle in the usual manner, is designed to be engaged by an end embracing band which clamps and conforms the upper to the sides of the last at one end,—as shown herein the heel end of the last,—and holds the last with its shoe upper and insole for the operation of the lasting wipers. A bracket plate 80 is secured to the front face of the frame 8 adjacent to its upper edge to receive a pin 81 which serves pivotally to interconnect the overlapped rear ends of carrier members or plates 79. The inner edges of the carrier plates adjacent to their point of pivotal connection are curved to correspond substantially with the contour of the rear of the last and shoe and have attached thereto and upstanding therefrom similarly shaped pressure members 82. From the forward or outer ends of the conforming or pressure members 82 outwardly, the carrier plates 79 are cut away transversely of the machine. Positioned within these cutaway portions of the carrier plates are a series of pressure members 83 pivotally mounted between the bifurcated forward ends of plungers 84 by means of transverse ears 85 and pivot pins 86. The plungers 84 are guided in transverse bores in the carrier plates and the pressure members have downwardly extending arms 87, slotted at their outer ends to embrace rods 88 secured to and depending from the carrier plates and having flanges 89 adjacent their upper ends, against which the outer ends of the depending arms 87 are held by coiled springs 90 sleeved upon the rods between the arms 87 and adjusting nuts 91. The series of pressure plates 83 will be positioned at opposite sides of the last and shoe upper and will extend longitudinally of the shoe upper and form a substantially continuous pressure surface at the opposite sides of the shoe, and in conjunction with the pressure members 82, form a substantially continuous pressure surface which will extend around the side of the shoe and last at one end of the last. The pivotal mounting for the pressure members 83 enables these members to turn upon substantially horizontal axes to conform to the vertical contour of the sides of the last and shoe. They are independently adjustable toward and from the opposite side faces of the last by means of threaded sleeves 94 screwing into the outer ends of the transverse bores in the carrier plates 79, these sleeves coöperating also with nuts 95 to vary the tension of coiled springs 93 sleeved on reduced sections 92 of the plungers 84 between the adjusting sleeves and the enlarged inner ends or heads of the plungers. A flexible U-shaped clamping band 78 is attached to the series of pressure members 83 in any suitable manner, preferably by means of screws 96 inserted in the pressure members from the clamping band at points adjacent to its lower edge. Preferably, the lower edge of the band is channeled to provide a flap to cover the head of attaching screws 96 and to prevent injury to the upper materials. The clamping band is yieldingly connected with the end pressure members 82 by means of screws 97 attached to and extending from the clamping band through bores in the pressure members 82 and carriers 79. The carrier plates are each counterbored to provide a socket in which a coiled spring 99, sleeved about the shank of the screw 97, is held by a nut 98 threaded upon the outer end of the screw 97 and serving yieldingly to hold the clamping band to its seat. This yielding connection permits the band to move away from its seat on the conforming plates 82 when the band is fully opened. Coiled springs 100 attached to the outer rear edges of the carrier members 79 and anchored to the sides of the frame 8, normally hold the carrier plates with the clamping band in fully opened position.

The rear edges of the carrier plates are inclined outwardly and forwardly to form wedge faces and are engaged at opposite sides of the pivot point 81 by rollers 102, at the forward ends of spaced and complemental thrust bars 101, guided for longitudinal reciprocating motion lengthwise of the machine by screws 103 (Fig. 9) seated in the frame 8 and extending through longitudinal guide slots formed in the thrust bars. The rear ends of the thrust bars are formed as rods which project through bearings in a cross bar 104 of the frame. These thrust bars are reciprocated toward and from the rear edge of the carrier plates 79 by means of a bell crank lever 105 (Fig. 4) journaled between the sides of the frame 8 below the thrust bars and having one end provided with a roller 106 seated in a cam groove 107 formed in the face of the cam 22. The other and upper end of the bell crank lever is formed with teeth to engage a segmental gear 108 attached to a rock shaft 109 journaled in the sides of the frame 8.

Two arms 110 are mounted upon the rock shaft in laterally spaced relation and have their upper ends bifurcated loosely to engage pins 111 projecting laterally from the forward ends of a yoke 112 (Figs. 4 and 9) from which spaced rods 113 extend rearwardly through suitable bearings in the frame 8 and freely through openings in a cross bar 114 spaced from the rear of the frame 8. The ends of the rods are engaged by adjusting nuts 115 at the rear side of the cross bar and coiled springs 116 are sleeved on the rods 113 between the rear of the frame 8 and the forward face of the cross bar and offer yielding resistance to the forward movement of the cross bar. The tension of these springs may, obviously, be adjusted through the nuts 115. The rods projecting rearwardly from the thrust bars 101 likewise project and slide freely through sleeves 117 threaded into opposite ends of the cross bar 114 and yieldingly connected with the rods of the thrust bars by coiled springs 118 sleeved upon the rods between the forward flanged heads of the sleeves 117 and collars 119 fixed to the rods.

When the disk 22 is turned and the bell crank 105 is rocked through the operation of its cam groove 107 to turn the rock shaft 109 through the medium of segmental gear 108, the arms 110 are rocked to move the yoke 112 longitudinally toward the carrier members 79 and through the rods 113 and their connections with the cross bar 114 to operate the cross bar to move the thrust bars 101 forwardly and close the carrier frames and clamping band, compressing the coiled springs 116, 118, the latter transmitting pressure yieldingly to the members 79, and tensioning springs 100, so that when permitted by the cam groove 107, these springs will act to retract the thrust bar rollers 102 and to open the carrier plates 79. The length of the stroke of the thrust bars and, therefore, the closing movement of the carrier plates is adjusted through the nuts 115, and the yielding pressure brought to bear against the rear edges of the carrier plates by the thrust bars may be varied for each carrier plate independently through adjustment of the sleeves 117.

When a last with its shoe upper and insole is mounted upon the last spindle 42, and the machine started to cause rotation of the cam disk 22 and closing movement of the carrier plates 79, not only will the carrier plates be yieldingly closed, but the pressure members 83 will clamp the shoe upper at the sides of the last under yielding, conforming pressure through the springs 93, so that the upper is conformed to the longitudinal contour of the last, and the pivotal mounting of these pressure members causes them automatically to rock during the closing movement of the clamping band automatically to conform the clamping band and shoe upper to the vertical contour of the sides of the last. The springs 90 normally hold the pressure members against rocking movement so that closing pressure of the carrier members 79 causes these pressure members to rock on their pivots in a predetermined direction, their upper portions swinging outwardly and their lower portions inwardly, and only to such extent as is required for conformation to the vertical contour of the last sides, and the springs 90, when compressed by this conforming movement, assist in holding the pressure members in conforming position under tension. This is also true of the springs 93 and 118 which hold the pressure members in conformation to the lengthwise contour of the last sides under spring tension. It will be evident that the members 79, by reason of their pivotal mounting at the end of the shoe, have a component of forward movement at the sides of the shoe, and that the pressure members 83 thus receive a slight forward movement in the closing of the band which assists in drawing the upper tightly about the heel end of the last.

The clamping band 78 is designed to engage and clamp the upper against the sides of the last from a line adjacent to the bottom face of the last transversely of the sides of the last for a substantial distance and preferably for substantially the full width of the sides of the last corresponding to the counter portion of the shoe, the band engaging the sides of the upper first adjacent to the shoe bottom and then closing in against the tension of the springs 90 into conforming relation to the contour of the last.

When the last is mounted upon the last pin 42 the last spindle is swung forwardly to clear the holddown so as to permit the last to be inserted upon the last pin 42 without interference by the holddown and the spindle is then swung rearwardly by the operator, downward pressure being exerted to cause the light spring 45 to yield to permit the bottom of the insole to be brought beneath the holddown. When the rear end of the shoe is brought into engagement with that part of the band which is on the conforming plates 82, downward pressure is discontinued and the spring 45 will act to move the last upwardly approximately to lasting position. The treadle 19 is then operated to start the machine, whereupon, the cam 22 effects the closing of the clamping band 78, and the shoe is jacked and positioned for the lasting operation as will be explained more in detail hereinafter.

Subsequent to the clamping of the last and shoe, end lasting wipers are projected up and over the bottom of the last to break down the upstanding marginal portions of the shoe upper over the bottom of the insole and to compact the broken down portions over the bottom of the insole.

This end lasting mechanism is carried by a head or wiper carrier 123 having a rearward extension 141 provided with a longitudinal channel 140, at and within the forward end of which is seated an ear 139 having a stem 142 extending loosely upward through a bore in the head and having its end screw threaded to engage in a threaded bore in the upper end of an inverted cup 143 housing a coiled spring 145 sleeved upon the stem 142 between the top of the head 123 and the upper or closed end of the inverted cup 143. The bottom edge of the cup is spaced above the top face of the head 123 a sufficient distance to permit a determinate maximum compression of the spring 145 by upward movement of the wiper head 123. Preferably, a nut 144 is provided to assist in holding the cup 143 in adjusted position. The ear 139 supports the forward end of the wiper head through the pivotal connection thereto of the upper forked end of a rock arm 138 journaled upon the rock shaft 109 for free turning movement thereon.

Figure 3:
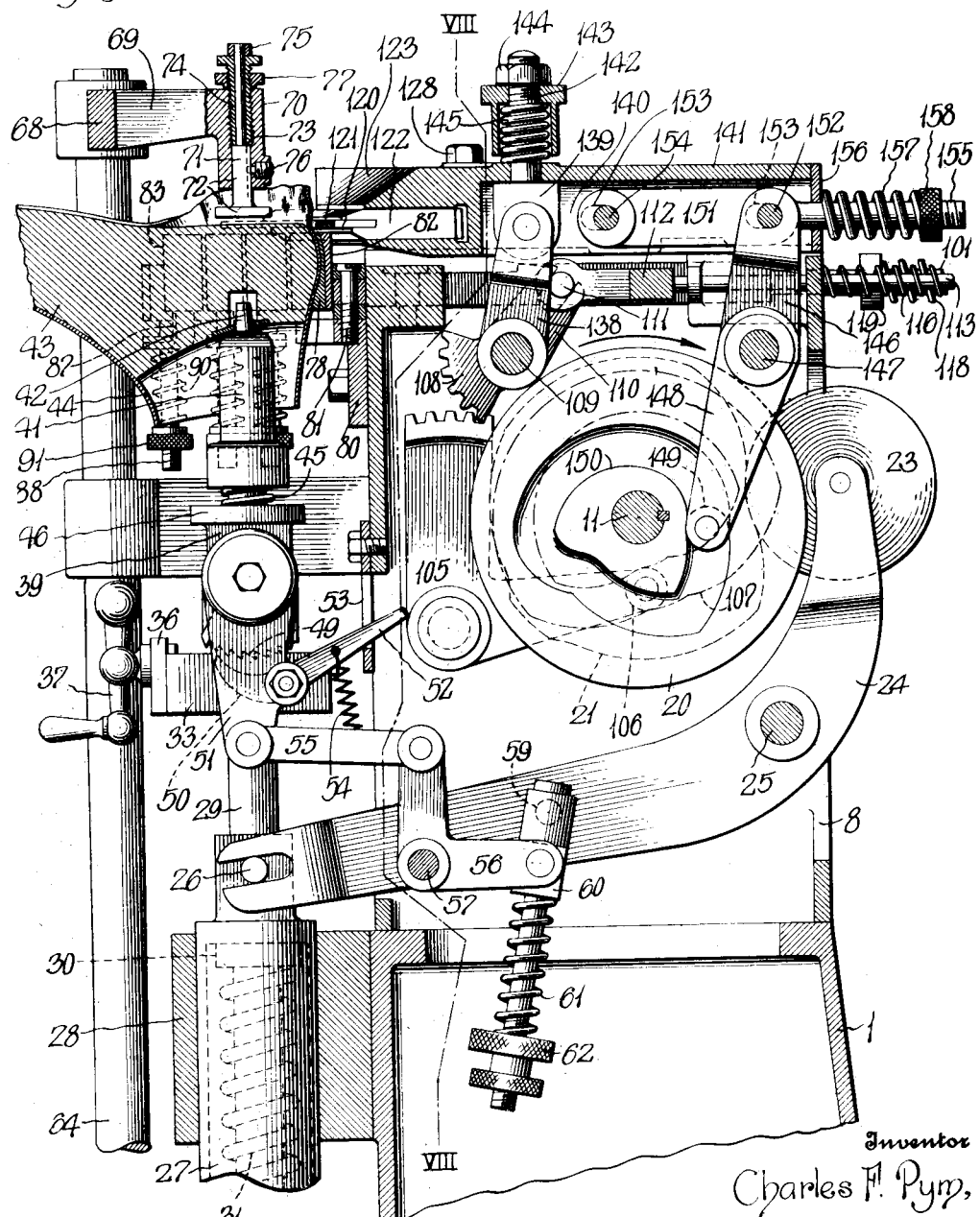
Fig. 3 is a vertical section through the upper part of the machine, on an enlarged scale and with the wipers retracted.
Figure 4:
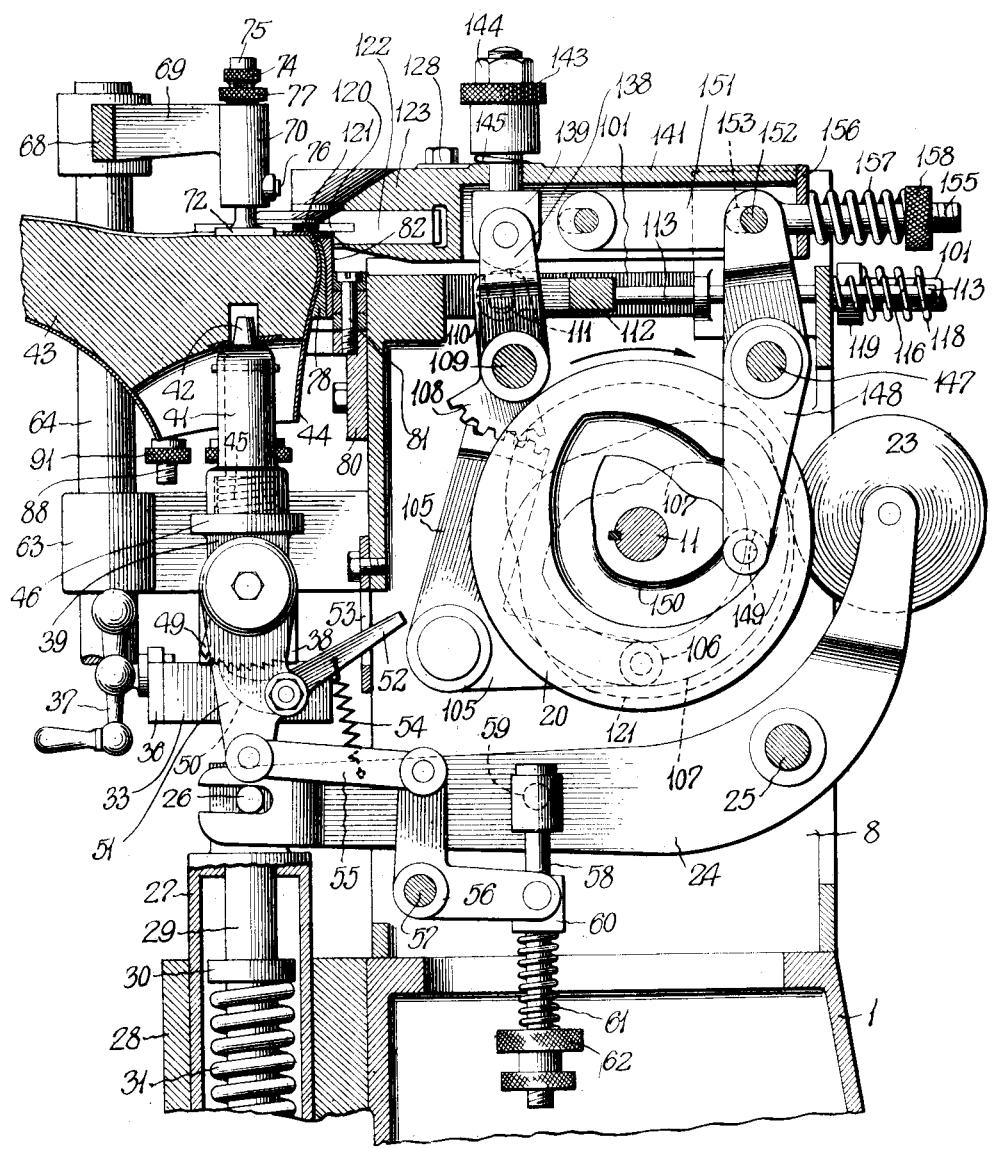
Fig. 4 is a similar view with the wipers partially projected and with the last raised and clamped.

The rear end of the extension 141 of the wiper head is supported by a forked arm 146 secured upon a rock shaft 147 which is mounted in bearings in the sides of the frame 8 near its rear end and has a downwardly extending rigid arm 148 carrying a roller 149 at its extremity riding in the cam groove 150 of the cam disk 20. The forked upper end of the arm 146 embraces a link 151 lying within the channel 140 of the rearward extension of the wiper head and is pivotally connected to the rear end of said link by a pin 152 passing through the link, the forked arms and into elongated horizontal guide slots (Fig. 6) in the side walls of the channel 140. The forward end of the link 151 terminates at a point rearwardly of the ear 139 and is connected to the extension 141 by a transverse pin 154 extending through the end of the link and guiding in horizontal elongated slots alined with the slots 153 in the side walls of the extension and similarly designated. The pins preferably have a relatively loose fit in the slots to provide for slight relative vertical movement between the pins and the slots. The arms 138 and 146 which support and operate the wiper carrying head 123 are substantially parallel, as shown in Figs. 3 and 4 and thus tend to maintain the wipers in substantially uniform angular relation to the plane of the shoe bottom, the wiper head, however, being permitted to swing yieldingly about the pin 152 as an axis against the tension of the spring 145 in response to resistance of the shoe materials.

The link 151 is provided with an integral, rearwardly extending rod 155 (Figs 4 and 6) guided through the rear wall 156 of the wiper head and having its end threaded to receive an adjusting nut 158 acting against the rear end of a coiled spring 157 sleeved on the rod 155 between the rear face of the wall 156 and said nut. This spring provides a yielding connection between the wiper operating disk cam 20 and the wiper head 123, so that in the event of substantial opposition to forward movement of the wipers carried by the wiper head, the spring 157 may yield to prevent damage to the operating parts.

The wipers are in the form of pivotally connected plates 120 having inner formed edges to approximate the outline of the end portion of the last when they are closed upon the last. The rear ends of these plates overlap and are pivotally interconnected by a pivot pin 121 located adjacent to the inner edge of the plates and approximately in the vertical plane of the longitudinal median line of the last. These wiper plates are mounted and held within horizontal slots in the forward edges of wiper carrying members 122 which, in turn, fit and slide freely within similarly formed recesses in the forward end of the wiper carrying head 123.

The outer or rear edges of the wiper plates are formed substantially semi-circular in plan view when the plates are in open position and the slots in the carrier members which receive the wipers are similarly formed.

The wiper plates are removably held in their carrier members by vertical pins 124 (Fig. 6) carried by the carrier members and extending through and engaging the inner ends of curved slots formed in and extending inwardly from the outer edges of the wiper plates so that the pins permit limited turning movement of the wiper plates in either direction relatively to their carrier members. The wiper plates may be readily removed from their carrier members by removing the retaining pins.

The rear edges of the carrier plates 122 are formed substantially semi-circular in plan view and are provided with teeth which form gear segments 125 arranged to be engaged by pinions 126 located in suitable recesses in the head 123. The groove or recess in the wiper head which receives the carrier members 122 is shaped to conform to the semi-circular form of these members which are loosely held to turn freely in the had by means of screws 127 in the head passing down through slots in the carrier members formed on arcs concentric with the pivot 121 of the wiper plates.

To rotate the pinions 126 and the connected gear segments 125 of the carrier members while the wiper head is being projected bodily forward toward the end of the shoe, each of the pinions 126 is mounted upon a stud 128 (Fig 8) and also carries a smaller and superposed pinion 129 mounted on a hub of the pinion 126 to turn therewith. These studs and pinions are located at opposite sides of the wiper head. Complemental rack bars 130, also located at opposite sides of the head are guided therein for engagement with the pinions 129. These rack bars are substantially stationary relatively to the reciprocating wiper head, so that through the rack bars, rotary motion is communicated to the pinions 129 and 126 and thence to the wiper carrier gears 125 to close and open the wiper plates as the wiper head is moved toward and from the end of the shoe.

Preferably, the rack bars are yieldingly held against movement with the wiper head in wiper projecting direction since it is desirable to permit the wipers to yield more or less in case abnormal resistance is encountered due to the character of the upper materials or to improper adjustment of the shoe positioning means or wiper mechanism. Accordingly, rods 131 are connected to the rear ends 130 of the rack bars by links 132, these rods having collars 135 formed adjacent their forward ends and extending through bores formed in exteriorly threaded sleeves 133 adjustable in interiorly threaded ears 134 rigidly attached to and upstanding from the sides of the frame 8 (Figs. 2 and 8).

The extremities of the rods 131 extend beyond the rear ends of these sleeves and are threaded to receive adjusting nuts 137 between which and the flanged rear ends of the sleeves coiled springs 136 are sleeved upon the rods yieldingly to hold the rack bars 130 against forward movement with the wiper carrying head while the collars 135 abutting the opposite ends of the sleeves 133 positively resist rearward movement of the rack bars 130 with the wiper carrying head when it is retracted away from the shoe.

Consequently, in the forward closing movement of the wiper head, the wipers are yieldingly moved against the marginal portions of the upper to avoid damage to the operating parts through unusually heavy resistance to breaking down action of the wipers, while on the reverse movement of the parts when no resistance is encountered, the movement of the wipers is positive.

If for any reason the shoe should be presented to the wipers with the longitudinal median line of its heel end portion at an angle to the path of bodily movement of the wipers, it will be evident that the wiper at one side might encounter abnormal resistance to its closing movement by reason of premature engagement with the shoe. In such an event the yielding wiper operating connections above described permit the closing movement of such wiper to be retarded, the corresponding rack bar 130 being carried along with the wiper against the tension of the spring 136 in the continued movement of the wiper lengthwise of the shoe, while the wiper at the other side continues its normal closing movement, until such time as change in relation between the resistance of the spring 136 and that of the shoe materials permits the first wiper to resume its closing movement. It will be evident, moreover, that the arrangement of the rack bar and the spring may permit the wiper to be moved reversely by wedging action of the shoe during the movement lengthwise of the shoe if such abnormal resistance is encountered. The independently yieldable connections to the wipers thus provided permit the wipers to adjust themselves relatively substantially about their axis of closing movement in conformity to the contour and position of the shoe.

In the event that extreme resistance is encountered to the closing movement of both wipers, the springs 136 will yield and will permit the rack bars 130 to move with the wiper head, the gears 129 and 126 remaining stationary during the yielding movement of the springs or turning reversely due to wedging action of the shoe, thus stopping the closing movement of the wiper plates or permitting them to be partially retracted. Obviously, the tension of the springs 136 may be varied by adjustment of the nuts 137. The sleeves 133 permit independent adjustment of each of the rack bars 130 in a longitudinal direction in order to effect adjustment of the wiper plates for last ends of substantially variant contour.

In the retracted position of the wipers and their carrying head, the arms 138, 146 supporting said head are positioned so that their upper ends are beyond the dead center line of their swinging movement, or in other words are rearwardly of vertical lines, drawn perperdicularly to the axes upon which they turn. Therefore, when the arm 146, and consequently arm 138, is rocked through the action of the cam groove in the disk 20 to move the wiper head forwardly toward the end of the shoe, the wiper head will be slightly elevated, the movement being in a direction lengthwise of the machine and toward the end of the shoe and having a relatively slight upward component. The path of movement will, therefore, be upwardly inclined until the pin 152 and the pin connecting the arm 138 to the ear 139 reach the dead center of the swing of their arms 146 and 138, which point is reached approximately at the time the wipers engage the upper and press it against the last, after which the forward projecting movement has a slight downward component.

The last, shoe upper and insole are positioned by the initial jacking movement so that the plane of the lower face of the wipers 121 in retracted position is below the plane of the insole on the bottom of the last and preferably slightly below the plane of the bottom of the last. The forward projecting movement of the wiper head will move the wiper plates 121 forwardly and close them into contact with the shoe upper substantially or approximately at the line of merger between the side of the last and the bottom of the last.

The forward projecting movement of the wiper head will continue, and the edges of the wipers engaging the upper materials frictionally draw the stock and by the wedging action of the stock are forced to climb up over the edge of the insole as they are advanced forwardly and closed, this climbing action, which serves to draw the upper materials tightly up over the edge of the insole, being permitted by reason of the upward yielding of the wiper head against the tension of spring 145. This yielding movement results in the compression of the spring 145, so that the wiper plates move over the edge of the insole with the force of the tensioned spring 145 acting downwardly against the wipers and aiding to break down and compact the upper materials over the edge of the insole.

This downward pressure is in a direction substantially perpendicular to the bottom of the insole, and in coöperation with similar upward pressure exerted by the last jack to force the edges of the upper against the bottom faces of the wipers, as will be later explained, is effective thoroughly to iron down and thoroughly to compact the overworked marginal portions of the shoe upper materials.

The cam groove in the disk 20 is constructed preferably to advance the wipers over the bottom of the insole and partially to retract the wipers, the operation of the machine being automatically stopped at this point to permit the insertion of lasting tacks; subsequently the wipers are again advanced and finally retracted. The operation of the last jacking, shoe clamping and wiper operating mechanism in their timed relation will now be described.

As an aid to understanding the timed relation of the parts, reference is made to the plotted cam paths of the wiper operating, last jacking and clamping band controlling cams, and the motion arresting disk disclosed in Figs. 14 to 17 of the drawings, in which the time periods are divided into twentieths, the division lines being lettered consecutively $a$ to $t$, inclusive, in a direction opposite to that of rotation of the cams, the motion arresting disk 12 being divided in like manner to show the relation of its stop notches to the cams.

In the operation of the machine, the pivoted last spindle is first swung outwardly from beneath the holddown 72, (the pawl 50 being released by engagement of its arm 52 with the plate 53 at the lower end of its slot when the machine comes to rest at the end of a cycle), and a last with its shoe upper and insole thereon is mounted in inverted position on the pin 42 of the last spindle with one end, in the present showing the heel end, of the last and shoe upper toward the rear of the machine to be operated upon by the clamping and wiping mechanisms for lasting the heel seat. The last pin being yieldingly supported, may be depressed to enable the last to be mounted on the pin without catching the lower edge of the upper on the pin and pulling it into or against the last thimble.

The last spindle with the last and shoe are then swung rearwardly toward and it may be loosely against the rear end of the clamping band 78, the last spindle being pressed downwardly against the tension of its spring 45 to clear the holddown as the end of the last is moved beneath and beyond the holddown. The last is now released and will be positioned by the spring 45 with its insole above the plane of the wipers and below the holddown as suggested in Fig. 3.

The adjusting screw 35 may now be operated, if necessary, to position the shoe sole at a desired inclination relatively to the plane of the wipers. When the end of the last to be operated upon is substantially different in contour from that or those previously operated upon by the machine, the contour of the wipers may be quickly adapted to the change of contour by turning the sleeves 133 controlling the rack bars 130. No corresponding adjustment of the clamping band 78 is usually necessary since this band tends to conform itself to different contours of last ends, but if conditions require such adjustment it may be effected as hereinbefore described.

These preliminary steps having been taken, the cycle of the machine may now be started by operating the treadle 19, retracting the stop member 15 and throwing in the clutch to start the rotation of the cam shaft.

When the machine is started, the cam disk 21 first becomes active, lifting the jack rod 29 upwardly and coincidently pressing the last spindle backwardly toward the clamping band. The upward movement of the spring cylinder 27 causes the holddown 72 to move downwardly to engage the insole and finally depress the last and its rod 29 slightly to position the surface of the insole above the plane of the wipers with the jack spring 31 under tension and with the last spindle yieldingly held by pawl 50 in its backwardly swung position. These actions occur during the first three intervals ("$a$" to "$d$," inclusive) of the cycle and the parts are maintained in this relation by their cam 21 until the wipers start their closing movement. It will be noted by reference to Fig. 4 that as the parts are thus positioned the sleeve 41 is seated against the collar 46 and the shoe is upheld through the tension of the spring 31 against the holddown 72 the position of which is positively determined by its operating connections.

During the above described operation of clamping the shoe, the cam groove in cam disk 22 is practically inactive and only begins to act to close the clamping band 78 about the end of the last and shoe upper as the holddown approaches the limit of its downward movement. As plotted (Fig. 17) the cam groove 107 in the cam disk 22 begins to act against the clamping band to close the clamping band in the third interval of the cycle, the closing movement, as plotted, commencing at the end of the second interval "$c$" and ending during the sixth interval, the clamping band remaining fully closed from this point on until near the end of the cycle when the wipers start on their final retracting movement.

Up to the time that the clamping band reaches fully closed position the cam groove in the wiper cam disk 20 has been concentric and has not acted against the roll 149 and lever 148 to operate the wipers. As the clamping band reaches fully closed position, however, a rise in the cam groove acts against the roll and lever to move the wiper head 123 forwardly to project the wipers over the edge of the insole, the racks and pinions operating to close the wipers as they climb up over the edge of the insole and are tensioned downwardly to break down the upstanding marginal portion of the upper.

As the wipers begin to close over the edge of the insole, the jack cam 21 acts to lower the spring cylinder 27 and coincidently to lift the holddown 72 so that the tension of the compressed jack spring no longer is taken by the holddown but is effective to force the marginal portion of the upper against the faces of the closing wiper plates 121 with compacting pressure acting substantially perpendicularly to the plane of the wipers and insole, opposing the downward compacting tension of spring 145 on the wiper plates and it may be, raising the shoe to take up the vertical yield of the wipers to hold the wipers rigidly against vertical displacement during their further advance so that the combined and maximum downward and upward compacting pressures act upon the marginal portion of the upper during the first closing movement of the wipers when maximum compressive force is needed to "break down" the upper.

The closing movement of the wipers, as plotted, occurs in the time intervals between "g" and "l" of the movement of wiper cam 20 and the transference of the jack spring tension occurs in the intervals between "i" and "l", representing the movement of the wiper plates inwardly over the edge of the insole. As the wipers approach the limit of their closing movement the jack cam 21 acts to move the jack spring cylinder 27 upwardly, further tensioning the jack spring against the wipers and coincidently lowering the holddown 72 to engage the insole and to take the pressure of the jack spring off the wipers so as to prevent drag on the wipers as they retract.

This last point is reached at the limit of closing movement of the wipers, the position of the holddown being maintained by cam 21 during the next interval ("l" to "m") of cam movement, during which the wipers are retracting reaching the limit of a first (and partial) retracting movement at the end of the following period ("m" to "n") of cam movement. During this following period the jack cam 21 lowers the jack spring cylinder 27 and lifts the holddown so that the compressed jack spring again acts against the face of the wiper plates which have been only partially withdrawn and are still projected over the edge of the insole. Pressure of the wipers against the last, acting against the pivoted last pin, holds the end of the last hard against the clamping band.

The cam groove in wiper cam 20 is practically inactive to close the wipers during the next interval ("n" to "o") at the end of which notch 14 on the motion arresting disk 12 is alined with the roller 16 on arm 15, which is forced into the notch by its spring, stopping further rotation of the cam shaft 11 as previously described. When the operation of the machine is thus arrested, the wipers are partially retracted from their first advance and are about to close over the insole for a second wiping movement and the jack cylinder 29 has been lowered and the holddown lifted, thereby again putting the upward pressure of the tensioned jack spring against the faces of the wipers.

This point or halt in the cycle may be utilized for the insertion of lasting tacks to fasten the edge of the wiped over marginal portion of the shoe to the insole, although, it is within the province of the invention to arrange the notch 14 in the disk 12 to cause the motion arresting action at a different and later stage of the operation such, for instance, as when the wipers are finally retracting but before they are withdrawn from over the edge of the insole.

Assuming that the lasting tacks are inserted in this interval the machine is again started by operating the treadle 19. The wipers are now again closed fully over the insole with upward compacting pressure against the wipers by the jack spring and with downward pressure against the wipers from the spring 145 of the wiper head, this pressure being slightly reduced since the marginal portion of the upper has been "laid down" over the edge of the insole by the first closing movement of the wipers so that in the preceeding retraction and in the present (and second) closing movement, the upward pressure of the insole and overlaid upper against the wipers is reduced. As the wipers approach their limit of closing movement the jack cam again acts to lower the holddown and relieve the pressure of the jack spring against the wipers, as shown in Fig. 16.

The wipers reach the limit of their second closing movement at the end of period "q"—"r" in the cam plot and immediately start to retract. Coincidently the groove in the clamping band cam 22 acts to open the clamping band which is fully opened by the time the wipers are fully retracted beyond the edge of the insole. Coincidently with retracting movement of the wipers and opening movement of the clamping band, the jack cam 21 acts to relieve upward pressure against the wipers by lowering the spring cylinder 27 to its initial position at the beginning of the cycle, this position being reached when the wipers reach fully retracted position. As the jack rod 29 reaches the limit of its downward movement, the tail 52 of the pawl 50 strikes the plate 53 at the lower end of its slot and releases the pawl so that the last spindle 39, is automatically released and falls forwardly by gravity to a convenient position for the removal of the last and shoe. The machine operation is automatically halted at the end of the wiper retracting, clamping band opening and jack lowering movements by the roller 16 dropping into notch 13 and withdrawing the clutch. The machine is now ready for another cycle of operations similar to that previously described.

A preferred embodiment and construction of lasting devices and their power-operated mechanism has been illustrated in the accompanying drawings and described herein but it will be understood that the construction and arrangement of the parts may be varied within the spirit of the invention and the scope of the appended claims.

The method of lasting shoes exemplified by the "climbing wipers" of the described lasting mechanism and which consists generally, in forming the upper to the sides of the last and down over the margin of the sole on the last bottom by wiping the upper inwardly over the bottom edge of the last and over the margin of the sole by moving wipers upwardly and inwardly over the margin of the sole against heavy yielding resistance to upward movement producing strong frictional indrawing pressure on the upper at the bottom edge of the last and downwardly compacting pressure on the upper inwardly of said edge, is not claimed herein but forms the subject-matter of a divisional application, Ser. No. 169,749, filed May 19, 1917.

Having thus described my invention, what I claim as new and desire to secure by Letters Patent of the United States is:—

1. In a machine of the class described, in combination, a flexible end-embracing band, a series of pressure-applying members acting against each side of said band for substantially its full width and constructed and arranged to yield each independently in response to pressure against the band and last in such direction as to adjust themselves automatically to cause the band to press and conform the shoe upper closely to the longitudinal and vertical contours of the sides of the last, a common carrier for each series of said pressure members in which said members are independently mounted, and means for moving said carriers to apply pressure to the shoe through said members.

2. In a machine of the class described, in combination, a flexible end embracing band, and means for closing said band to conform the shoe upper to the sides of the embraced end of the last including a series of pressure applying members at each side of the band engaging the band for substantially its full width and operative responsively to pressure against the last and band to tilt about axes extending longitudinally of the band and shoe to force the band and shoe upper into conformity with the vertical contour of the sides of the last, spring means tending to resist such tilting movement of the members, a common carrier for each series of said pressure members, and means for moving said carriers toward the opposite sides of an embraced last end.

3. In a machine of the class described, the combination of an end embracing band, a series of pressure applying members at each side of the band forming a substantially continuous surface longitudinally of each side of the band, a common carrier for each series of pressure members, means for moving said carriers independently of and relatively to the last to cause said members to close the band upon the last, and mountings for said members permitting independent and automatic adjustment of the members against yielding resistance to conform the band and upper to the longitudinal and vertical contours of the sides of the last responsively to pressure of said members against the band and last.

4. In a machine of the class described, in combination, a flexible end embracing band, a series of independent pressure-applying members extending longitudinally of each side of said band and arranged for independent automatic adjustment through pressure to cause the band to conform the upper to the longitudinal and vertical curvatures of the sides of an embraced last end, a common carrier for each series of said members having yielding pressure-applying connections with each member, and means for moving said carriers toward and from the sides of a last and shoe end within said band.

5. In a machine of the class described, in combination, a flexible end embracing band, and closing means for said band arranged to be operated independently of an embraced last and shoe to force it toward the shoe and including a longitudinally extending series of independently yielding pressure-applying members engaging each side of said band for substantially its full width and constructed and arranged for independent automatic adjustment in different directions responsively to pressure against the last and shoe to cause said band to conform the upper to the longitudinal and vertical curvatures of the sides of an embraced last end.

6. In a machine of the class described, in combination, a substantially U-shaped flexible end embracing band, and band closing means comprising a series of pressure-applying members at each side of said band constructed and arranged for independent automatic adjustment through closing pressure against the sides of the embraced end of a last to cause the band to conform the upper to the longitudinal and vertical curvatures of the sides of the last, a common carrier for each series of pressure members having yielding connection with each pressure member, and means for moving said carriers and pressure members toward the opposite sides of an embraced last end.

7. In a machine of the class described, in combination, a flexible end embracing band for conforming a boot or shoe upper to the sides of an embraced last end, a series of pressure-applying members at each side of the band, a common carrier for each series of members in which they are mounted independently to yield bodily away from a last and independently to rock against yielding resistance about axes extending lengthwise of a last responsively to pressure against the band and last side, and means for moving said carriers toward and from opposite sides of the last end.

8. In a machine of the class described, in combination, a substantially U-shaped end embracing band, a plurality of pressure-applying members forming a substantially continuous pressure surface extending around substantially the entire band and including a series of independently yielding pressure members at each side of the band, a common carrier for each of said series, springs against which said members are yieldable relatively to their carriers and means for moving said carriers toward and from the opposite sides of the shoe embraced by said band.

9. In a machine of the class described, the combination of a flexible member for conforming a boot or shoe upper to the surface of its last, and pressure members to engage said flexible member to force the upper material into conforming contact with the surface of the last, said pressure members being pivoted to turn about axes extending lengthwise of the flexible member in response to pressure against the last, and resilient means tending to oppose said turning movement in one direction.

10. In a machine of the class described, a flexible end embracing band for conforming a boot or shoe upper to the sides of the embraced end of its last, and a series of pressure members supporting said band and arranged independently to turn against yielding resistance about axes extending longitudinally of an embraced last in response to pressure against the sides of said last, and yielding means tending to resist turning movement of said members.

11. In a machine of the class described, in combination, a flexible end embracing band for conforming a shoe upper to the sides of the embraced end of a last, opposed series of pressure applying members extending longitudinally of the sides of said band at opposite sides of the band, a common carrier for each series of pressure members on which said members are supported independently to swing against yielding resistance responsively to pressure against a last automatically to adjust themselves to the vertical contour of the sides of the last, and yielding means tending to resist such swinging movement of the members.

12. In a machine of the class described, in combination, a flexible end embracing band for conforming a shoe upper to the sides of the embraced end of its last, a series of pressure-applying members at each side of said band, a common carrier for each of said series on which said pressure members are pivotally mounted for independent swinging movements about axes extending lengthwise of an embraced last responsively to pressure against the band and last to conform the band and upper to the vertical contour of the sides of the last, spring means tending to resist said movements of the members in one direction, and means for moving said carriers toward and from the embraced end of the last.

13. In a machine of the class described, a flexible shoe end embracing band, a series of pressure applying members at each side of the band extending from the front end of the band rearwardly, carriers on which said members are supported independently of one another to yield laterally of the shoe, and thrust members movable lengthwise of the shoe in engagement with said carriers to force the carriers inwardly toward the sides of the shoe.

14. In a machine of the class described, a flexible shoe end embracing band, members arranged at opposite sides of said band for closing the band inward laterally of the shoe, said members having outwardly directed faces inclined to the lengthwise dimension of the shoe, and thrust members restrained from movement laterally of the shoe and movable lengthwise of the shoe in wedging engagement with said faces to force said members toward the sides of the shoe.

15. In a machine of the class described, the combination of a flexible member for conforming a boot or shoe upper to the surface of its last, a carrier member, means for moving the carrier member toward or from the side of the last independently of movement of the last, a pressure member attached to said flexible member and supported by said carrier member, and spring means for projecting the pressure member toward the side of the last and shoe upper and relatively to the carrier member.

16. In a machine of the class described, the combination of a flexible member for conforming a boot or shoe upper to the side of its last, a carrier member, means for moving the carrier member toward and from the side of the last and shoe upper, a pressure member supported by the carrier member and pivotally mounted to turn against yielding resistance about an axis extending longitudinally of the flexible member responsively to pressure against the flexible member and last, and spring means normally to hold the pressure member projecting relatively to the carrier member in the direction of the side of the last and shoe upper.

17. In a machine of the class described, the combination of a flexible member for conforming a boot or shoe upper to the side of its last, and a pressure-applying backing attached to the flexible member by yielding connections permitting the flexible member to move relatively to said backing.

18. In a machine of the class described, the combination of a flexible member for conforming a boot or shoe upper to the side of its last, a pressure-applying backing member having a seat for said flexible member, and a spring connection between the flexible member and the backing member yieldingly to hold the flexible member to its seat on said backing member.

19. In a machine of the class described, the combination of a flexible member for conforming a shoe upper to the side of its last at one end of the last, carrier members pivotally connected together closely adjacent to the end of the last and supporting a plurality of yielding pressure members connected to said flexible member, and means for moving said carrier members and pressure members to close the flexible member against the sides of the last and shoe upper at said end of the last.

20. In a machine of the class described, the combination of a flexible member for conforming a shoe upper to the sides of its last at one end of the last, carrier members pivotally connected together adjacent to the end of the last and supporting a plurality of yielding pressure members connected to said flexible member, means for moving the carrier members and pressure members to close the flexible member against the sides of the last and shoe upper at said end of the last, and pivoted wiper plates positioned to close over the bottom of the last and having their pivot approximately in alinement with the axis of the pivot of the carrier members.

21. In a machine of the class described, the combination of a flexible member for conforming a boot or shoe upper to the side of its last at one end of the last, carrier members for said flexible member pivotally connected together adjacent to said end of the last, and a series of independent pressure members on each carrier member to press said flexible member against the shoe upper at the sides of the last.

22. In a machine of the class described, the combination of a flexible member for conforming a shoe upper to the side of its last at one end of the last, carrier members for said flexible member pivotally connected together adjacent to the end of the last, and a series of independently movable spring pressed pressure members on said carrier members arranged to press the flexible member against the shoe upper at the side of the last.

23. In a machine of the class described, the combination of a flexible member for conforming a shoe upper to the side of its last at one end of the last, carrier members for the flexible member pivotally connected together adjacent to said end of the last, and a series of independently movable spring pressed pressure members supported by said carrier members and pivotally mounted independently to turn transversely of the length of the flexible member.

24. In a machine of the class described, the combination of a flexible member for conforming a shoe upper to the side of its last at one end of the last, carrier members for the flexible member pivotally connected together adjacent to said end of the last, and means for yieldingly operating said carrier members yieldingly to close the flexible member against the side of the last at said end of the last.

25. In a machine of the class described, the combination of a flexible end embracing member for conforming a shoe upper to the sides of its last at one end of the last, carrier members for the flexible member pivotally interconnected and provided with wedge faces, and means for yieldingly pressing said carrier members and the supported flexible member against the sides of an embraced last, comprising thrust members arranged to act against said wedge faces.

26. In a machine of the class described, the combination of a flexible end embracing band for conforming a shoe upper to the sides of its last at one end of the last, a series of pressure-applying members acting against said band and extending along the opposite sides of the band, and means for transmitting yielding closing pressure to said members, said means including wedge-faced pressure-transmitting members at opposite sides of the longitudinal median line of an embraced last, and thrust rolls acting against said wedge-faced members.

27. In a machine of the class described, the combination of a flexible substantially U-shaped end-embracing band, a series of pressure applying members embracing said band, and means yieldingly to press said members against said band to conform a shoe upper to the sides of its last, said means including wedge faced members at opposite sides of the longitudinal median line of an embraced last and thrust rolls acting against said wedge faced members.

28. In a machine of the class described, the combination of a flexible member for conforming a shoe upper to the sides of its last, carrier members for the flexible member pivotally connected together adjacent to the end of the last, a series of pressure members on each carrier member independently yieldable transversely away from the last and attached to said flexible member, and means for turning the carrier members upon their pivotal connection yieldingly to close the flexible member against the sides of the last at said end of the last.

29. In a machine of the class described, the combination of a flexible member for conforming a shoe upper to the sides of its last at one end of the last, carrier members for the flexible member pivotally interconnected adjacent to said end of the last and each provided with a plurality of transverse bores therein, plungers slidably mounted in said bores, springs arranged to hold the plungers projected in said bores, a pressure member pivotally attached to each plunger and connected to said flexible member, and means for operating the carrier members to close the flexible member against the sides of the last and shoe upper at said end of the last.

30. In a machine of the class described, the combination of a flexible member for conforming a shoe upper to the sides of its last at one end of the last, carrier members for the flexible member pivotally interconnected adjacent to said end of the last, a series of independent pressure members connected to said carrier members and pivotally mounted for independent movements, and means yieldingly to resist the turning of said pressure members about their pivots.

31. In a machine of the class described, the combination of a flexible member adapted to embrace a shoe upper mounted upon its last at one end of the last, a series of pressure members to engage said flexible member at each side of the last at said end to force the flexible member into last conforming contact with the sides of a shoe upper at said end of the last, the pressure members of each series together forming a substantially continuous surface to engage said flexible member, means for pivotally supporting the pressure members, and means yieldingly to resist the turning of each pressure member about its point of pivotal support.

32. In a machine of the class described, the combination of a flexible substantially U-shaped end embracing band for conforming a boot or shoe upper to the surface of a last at one end of the last, and means for forcing said band into last-conforming contact with the upper materials independently of movement of a last including a plurality of pressure members forming a substantially continuous pressure surface extending lengthwise along each side of the band and mounted for independent yielding contact with said band to conform the band and upper materials to the surface of the last.

33. In a machine of the class described, the combination of a substantially U-shaped end embracing member for conforming a boot or shoe upper to the side surfaces of a last at one end of the last, and means for forcing said end embracing member into last-conforming contact with the upper materials independently of movement of a last including a plurality of spaced independent pressure applying members at opposite sides of the longitudinal median line of the last arranged to be engaged with the end embracing member under pressure and independently to yield to conform the end embracing member and upper materials to the side surfaces of the end of the last.

34. In a machine of the class described, the combination of end embracing means arranged to be operated to embrace and conform a shoe upper to the sides of its last at one end of the last, a last support and an opposed member relatively movable to clamp a last between them, and means operated by said relative last clamping movement of the parts to force the last and shoe upper lengthwise in upper conforming contact under substantial pressure with said end embracing means at the extremity of the last.

35. In a machine of the class described, the combination of means for embracing and conforming a shoe upper to the sides of its last at one end of the last, a last support, a member to oppose the last support, means for relatively moving said support and opposed member to clamp the last between them, and means operated by such relative movement of the support and opposed member to move the last and shoe upper lengthwise in a direction to force the shoe upper into contact with said conforming means.

36. In a machine of the class described, the combination of means for embracing and conforming a shoe upper to the sides of its last at one end of the last, a last support, a member to oppose the last support, means for relatively moving said support and its opposing member to clamp the last between them, and means operated by said means for relatively moving the support and member yieldingly to force the last endwise toward said conforming means.

37. In a machine of the character described, the combination of means for conforming a shoe upper to the sides of its last at one end of the last, opposed members relatively movable toward each other to clamp a last between them, mechanism for moving said members to clamping position, and means organized automatically to force the last in the direction of its length and toward said conforming means responsively to movement of said mechanism to clamp the last.

38. In a machine of the class described, the combination of means for conforming a shoe upper to the sides of its last at one end of the last, clamping means to support and hold the last including members relatively movable toward and from each other and constructed and arranged to force the last in the direction of its length toward said conforming means at said end of the last, and means for operating said members to clamp a last between them and coincidently to move the last lengthwise of the conforming means, said clamping means being arranged to yield lengthwise of the last to provide a yielding contact of the shoe upper with said conforming means at the extreme end of the last and shoe upper.

39. In a machine of the class described, the combination of end embracing means arranged to be operated to embrace and conform a boot or shoe upper to one end of a last, a last support and an opposed member relatively movable to clamp a last between them, means to effect relative clamping movement of said support and member, means operated by said relative clamping movement to force the last support with its last and upper materials lengthwise in upper-conforming contact under pressure with the end embracing means at the end of the last and yieldingly to maintain the last support in such pressure applying position, and means to actuate the end embracing means to embrace the upper and last to conform the upper to the sides of the last at its end.

40. In a machine of the class described, the combination of a clamping band arranged to be closed to embrace and conform a boot or shoe upper to one end of a last, a last support and an opposed member connected for simultaneous movement toward each other to clamp a last between them and for movement from each other, mechanism for effecting relative last clamping movement of the support and member, means operated by said mechanism to force the last support with its last and upper materials lengthwise in upper conforming contact under pressure with the clamping band at the end of the last and yieldingly to maintain the last support in such pressure applying position, and means operative in time relation to close the clamping band to conform the upper materials to the sides of the last at said end of the last.

41. In a machine of the class described, means for clamping and supporting a last in operative position for lasting, including opposed members at the top and bottom of a last, respectively, arranged to clamp a last between them, and direct connections between said opposed members arranged to cause one of them to move whenever the other is moved to clamp the last.

42. In a machine of the class described, means for clamping and supporting a last in operative position for lasting, including opposed members at the top and bottom of a last, respectively, arranged to clamp a last between them, and operating connections between said members effective to cause the same to move invariably in opposite directions toward or from each other.

43. In a machine of the class described, means for clamping and supporting a last in operative position for lasting, including opposed members at the top and bottom of a last, respectively, arranged to clamp a last between them, means connected to one of said members to operate it, and direct connections between said members to cause the member which receives such operative movement to impart simultaneously to the other member movement in the opposite direction.

44. In a machine of the class described, means for clamping and supporting a last in operative position for lasting, including opposed members at the top and bottom of the last respectively, arranged to clamp a last between them, one of said members having last engaging means thereon arranged to yield relatively to the other member, means for operating one of said opposed members, and means directly connecting the operable member to the other of said opposed members for imparting movement to the other to cause said opposed members to move simultaneously toward or from each other upon actuation of the operating means.

45. In a machine of the class described, means for supporting and holding a last in position for lasting, including a last support and an opposed member between which the last is adapted to be clamped, said last support including a yieldable last engaging portion, operating connections between the last support and the opposed member effective to cause them to move invariably in opposite directions simultaneously, means for operating said member and support to move them in said opposite directions, and lasting means opposing movement of a last on said last support toward said opposed member when said lasting means is engaged with the marginal portion of a shoe upper over the bottom of the last.

46. In a machine of the class described, means for supporting and holding a last in lasting position, including an upwardly extending lower member to support the last from beneath, an upper member to engage the last from above, means for raising and lowering the lower member, and operating mechanism directly connecting said lower member with the upper member to cause the upper member to be moved by the lower member, said lower member having last engaging means thereon constructed and arranged to yield downwardly when raised to permit the last to be lowered by the coincident downward movement of the upper member in engagement with the last.

47. In a machine of the class described, the combination of wiper plates, means for projecting said plates over the edge of a shoe sole on the bottom of a last, opposed members directly connected for coincident movement toward each other to clamp a last between them and to support the last in lasting position, one of said opposed members being arranged yieldingly to support the last, and means for moving the other of said opposed members in time relation to the movement of the wiper plates over the edge of the shoe sole and in a direction to permit the yielding pressure of the other of said members to be operative against said wiper plates.

48. In a machine of the class described, means for supporting and holding a last in position for lasting, including a member to support the last, a member to engage the last at its opposite side to clamp the last, means for raising and lowering one of said members, said last named member having thereon last engaging means constructed to yield relatively to the clamping member, and operating mechanism directly connecting said members to cause them to move invariably in opposite directions.

49. In a machine of the class described, means for supporting and holding a last in lasting position including a member to support the last from beneath and an upper member to engage the last from above, operating mechanism directly connecting said members to cause them to move simultaneously in opposite directions, one of said members being pivoted to permit a longitudinal movement of the last, and upper conforming means positioned to engage the end of the last.

50. In a machine of the class described, the combination of opposed members adapted to hold a last between them, operating means directly connecting said opposed members arranged simultaneously to move said members toward each other to clamp the last between them, means for effecting longitudinal movement of the last coincidently with movement of said members toward clamping relation to the last, and upper conforming means positioned to oppose such longitudinal movement of the last.

51. In a machine of the class described, the combination of opposed members arranged to hold a last between them, means for simultaneously moving said members toward each other to clamp the last between them, means for effecting a longitudinal movement of the last conincidently with movement of said members toward clamping relation to the last, upper conforming means opposing said longitudinal movement of the last, and means operable subsequently to actuate the upper conforming means to clamp and conform the upper materials to the sides of the last.

52. In a machine of the class described, the combination of opposed members constructed and arranged to clamp a last between them, means for moving said members toward each other to clamp the last between them, means operated by such clamping movement of the members coincidently to move the last longitudinally, upper conforming means positioned to oppose such longitudinal movement of the last, and means for automatically operating the conforming means to clamp and conform the upper to the last in time relation to the longitudinal movement of the last.

53. In a machine of the class described, the combination of upper conforming means to embrace a shoe upper on its last at one end of the last, means for clamping and holding a last in lasting position, means operative to move the last longitudinally toward said conforming means, and means operative subsequently and in time relation to cause the conforming means to embrace and conform the upper materials to the sides of the last at said end of the last.

54. In a machine of the class described, means for supporting and holding a last in lasting position, including opposed members relatively movable to clamp a last between them, means for moving one of said members, and means for moving and supporting the other member, including an arm extending laterally over and spaced from the sole on the last and having operating connections from the first mentioned member.

55. In a machine of the class described, in combination, means for supporting and holding a last in lasting position, including opposed members relatively movable to clamp a last between them, means for moving one of said opposed members, means for supporting and moving the other of said opposed members including a vertically movable member having operating connections from the first-mentioned member and an arm carried by the upper end of said vertically movable member and extended laterally over and spaced from the surface of the sole portion of the last.

56. In a machine of the class described, in combination, means for supporting and holding a last in lasting position, including opposed members relatively movable to clamp a last between them, means for moving one of said members, means for moving and supporting the other of said opposed members including vertically movable members located at the sides of the last, a supporting arm for said other opposed member carried at the upper ends of said vertically movable members and extending laterally over and spaced from the surface of the sole portion of the last, and connections for transmitting motion to the said vertically movable members to cause simultaneous movement of the opposed members.

57. In a machine of the class described, in combination, heel lasting mechanism, means for supporting a last in lasting position, including an upwardly movable member having a spindle for supporting the heel end of the last, and means for moving said member upwardly and for simultaneously moving the spindle laterally toward the lasting mechanism, said spindle being bodily adjustable transversely of the upwardly movable member and in a direction lengthwise of the last properly to locate the heel end of the last relatively to the heel lasting mechanism.

58. In a machine of the class described, heel lasting mechanism, means for supporting a last in lasting position, including an upwardly movable last supporting member with a spindle pivotally mounted thereon and arranged to support the heel end of the last, said spindle being mounted for bodily adjustment transversely of the upwardly movable member and lengthwise of the last properly to locate the heel end of the last relatively to said lasting mechanism and being arranged to swing upon its pivot in a direction longitudinally of the last, and means operative in time relation to the upward movement of said supporting member to swing said spindle.

59. In a machine of the class described, the combination of end lasting mechanism, means for supporting a last in position for the lasting operation of said end lasting mechanism including a vertically movable member, power driven means for operating said member, a spindle carried by said member and arranged to support that end of the last to be operated upon, and means for adjusting said spindle into and out of vertical alinement with the longitudinal axis of said vertically movable member to locate said end of the last in appropriate relation to the end lasting mechanism.

60. In a machine of the class described, in combination, end lasting means, means for supporting a last in position for lasting a shoe upper thereon including a vertically movable rod, and an upwardly extending last spindle carried by and adjustable transversely of the rod into and out of vertical alinement with the longitudinal axis of the rod and in a direction longitudinally of the supported last properly to locate the end of the last relatively to said end lasting means.

61. In a machine of the class described, the combination of means adapted to conform a boot or shoe upper to a last at one end of the last, end wipers, and means to support a last in a position relative to said conforming means and end wipers for lasting a shoe upper on the last comprising a vertically movable standard, means for moving the standard vertically to lasting position, and an upwardly extending last supporting spindle mounted on said standard for bodily adjustment transversely of the standard and lengthwise of the last and for tilting movement to incline the last into a desired plane relative to the plane of the end wipers.

62. In a machine of the class described, means for supporting a last in lasting position, including a vertically movable rod with means for moving the rod vertically, an upwardly extending pivoted spindle, means for bodily adjusting said spindle in a direction transversely of the rod and lengthwise of the last, said spindle being adapted to turn upon its pivot, and means to adjust said spindle on its pivot in a direction longitudinally of the last supported by the spindle.

63. In a machine of the class described, means for supporting a last in lasting position including a vertically movable member, an upwardly extending pivoted spindle carried by said member, means bodily to adjust said spindle transversely of said member and in a direction lengthwise of a supported last, and means automatically operative to turn said spindle upon its pivot.

64. In a machine of the class described, means for supporting a last in lasting position including a vertically movable member and means for raising and lowering said member, a spindle pivotally attached to said member, and means operated by the raising and lowering means to turn the spindle upon its pivot.

65. In a machine of the class described, means to support a last in lasting position comprising a vertically movable member with means for raising and lowering said member, a spindle pivotally attached to said member, and means operative in time relation to the raising and lowering movements to turn said spindle upon its pivot.

66. In a machine of the class described, means to support a last in lasting position comprising a vertically movable member with means for raising and lowering said member, a spindle pivotally attached to the member, means operative in time relation to the raising and lowering movements to turn said spindle upon its pivot, and means yieldingly opposing turning movement of said spindle.

67. In a machine of the class described, the combination of means for supporting a last in position for lasting the end of a shoe upper thereon, end wiping mechanism comprising a carrier and end lasting wipers mounted thereon for yielding movement in a direction substantially perpendicular to the plane of the last bottom, spring means arranged to oppose heavy yielding resistance to such movement of the wipers, and means for moving the carrier and wipers bodily lengthwise of a supported last in such relation to the plane of the last bottom as to cause the wipers to engage the upper on the sides of the last below the plane of a sole on the last bottom and for continuing said bodily movement to cause said wipers to be forced by the shoe materials to climb up over the edge of the tread face of the shoe sole against said heavy yielding resistance.

68. In a machine of the class described, the combination of means for supporting a last in position for lasting the end of a shoe upper thereon, means to embrace and conform the upper to the sides of the last at said end, end wiping mechanism comprising end embracing wipers and a carrier for the wipers bodily movable lengthwise of a supported last toward and from the end of the last and on which said wipers are mounted for yielding movement substantially perpendicularly to the plane of the last bottom, spring means arranged to oppose heavy yielding resistance to such movement of the wipers, and means for coincidently closing the wipers and bodily moving the carrier and wipers lengthwise of and toward the last in such relation to the plane of the last bottom as to cause the wipers to embrace the sides of the last end below the plane of a sole on the last bottom and for continuing said bodily movement to cause the wipers to be forced by the shoe materials to climb up over the edge of the tread face of the shoe sole against said yielding resistance.

69. In a machine of the class described, the combination of means for supporting a last in position for lasting the end of a shoe upper thereon, end wiping mechanism comprising end lasting wipers and a carrier for said wipers bodily movable lengthwise of and toward the end of a supported last, operating means for projecting said carrier and wipers bodily lengthwise of the shoe in such relation to the plane of the last bottom as to cause the wipers to engage the upper on the sides of the last below the plane of a sole on the last bottom, and connections between said operating means and carrier constructed and arranged to permit the wipers bodily to be forced by the shoe materials up over the edge of the tread face of the shoe sole against yielding resistance upon continued projecting movement of said operating means and carrier.

70. In a machine of the class described, in combination, a last and shoe support, an end embracing band, an end lasting wiper, a wiper carrier, and operating means for said carrier organized bodily to move the carrier and wiper lengthwise of a supported last in such a plane as to cause the wiper to engage the upper on the last below the plane of the shoe sole and organized to continue said bodily movement to cause said wiper to climb up to and advance over the margin of the tread face of said sole, said operating means having a connection with said carrier constructed and arranged to permit said carrier to move upwardly with the climbing wiper against relatively strong yielding resistance.

71. In a machine of the class described, the combination of a last and shoe support, an end embracing band arranged to engage the sides of a shoe upper below the plane of its sole, end embracing wipers, a wiper carrier, operating means for said carrier organized bodily to move the carrier and wipers lengthwise of and toward the end of a supported last with a component of movement substantially perpendicular to the plane of the last bottom to bring the wipers into contact with the upper below the plane of the shoe sole and to continue bodily lengthwise movement of the wipers, and means yieldingly opposing upward movement of the wipers over the edge of the shoe sole as said wipers continue to move lengthwise of the last.

72. In a machine of the class described, the combination of a last support, end wipers for wiping the upstanding marginal portion of a shoe upper on a supported last down over the edge of a shoe sole on the bottom of the last, means to project the wipers over the bottom of the last at one end and to retract the wipers, and means operative to cause downward pressure against the wipers and coincident upward pressure of the edges of the shoe upper against the wipers during projection of the wipers and operative to relieve pressure against the wipers during each retracting movement of the wipers.

73. In a machine of the class described, the combination of a last support, end wipers for wiping the marginal portion of a shoe upper on a supported last down over the edge of a shoe sole on the bottom of the last, mechanism automatically to project the end wipers a plurality of times over the bottom of the last at one end and to retract the wipers after each projection, and means constructed and arranged automatically to cause downward compacting pressure against the wipers and coincident upward pressure of the edges of the shoe upper against the wipers in timed relation to and during each projection of the wipers and automatically to relieve pressure against the wipers during each retracting movement of the wipers.

74. In a machine of the class described, the combination of a last support, end wipers for wiping the marginal portion of a shoe upper on a supported last down over the edge of a shoe sole on the bottom of the last, means automatically to project the wipers a plurality of times over the bottom of the last at one end and to retract the wipers after each projection, and means operative to cause yielding downward pressure against the wipers and coincident yielding upward pressure of the edges of the shoe upper against the wipers during each projection of the wipers and operative in time relation to relieve pressure against the wipers during each retracting movement of the wipers.

75. In a machine of the class described, the combination of a last support, end wipers for wiping the upstanding marginal portion of a shoe upper on a supported last down over the edge of a shoe sole on the bottom of the last, mechanism operative automatically to project the wipers a plurality of times over the bottom of the last at one end and to retract the wipers after each projection, and means operative in time relation to cause downward pressure against the wipers and coincident upward pressure by the last support against the wipers during each projection of the wipers over the last bottom and operative in time relation to relieve the upward pressure of the last support during each retracting movement of the wipers.

76. In a machine of the class described, the combination of a last support, end wipers for wiping the upstanding marginal portion of a shoe upper on a supported last down over the edge of a shoe sole on the bottom of the last, mechanism operative automatically to project the wipers a plurality of times over the bottom of the last at one end and to retract the wipers after each projection, and means operative in time relation to cause downward yielding pressure against the wipers and coincident upward yielding pressure of the last support to press the upper yieldingly against the wipers during each projection of the wipers over the last bottom and operative in time relation to relieve the upward pressure of the last support during each retracting movement of the wipers.

77. In a machine of the class described, the combination of end wipers, last and shoe supporting means movable to position a last and shoe upper in coöperative relation to the wipers with the bottom of a sole on the last above the plane of the wipers, mechanism automatically operative to advance the wipers to engage the upper and relatively to move the wipers and last vertically to upwipe and conform the upper and subsequently to advance and retract the wipers over the shoe sole a plurality of times without backing the wipers off the sole between the first advance and last retraction of the wipers, and means operative to exert upper compacting pressure against the wipers perpendicularly to the plane of the sole during each advancing movement of the wipers and operative to relieve said pressure during each retracting movement of the wipers.

78. In a machine of the class described, the combination of end wipers, last and shoe supporting means movable to position a last and shoe upper in coöperative relation to the wipers with the bottom of a sole on the last above the plane of the wipers, mechanism automatically operative to advance the wipers to engage the upper and relatively to move the wipers and last vertically to upwipe and conform the upper and subsequently to advance and retract the wipers over the sole a plurality of times without backing the wipers off the sole between the first advance and last retraction of the wipers, and means operative to exert yielding downward compacting pressure on the wipers and yielding upward compacting pressure of the edges of the shoe upper against the wipers during each advancing movement of the wipers and operative to relieve the compacting pressure during each retracting movement of the wipers.

79. In a machine of the class described, the combination of end wipers, last and shoe supporting means movable to position a last and shoe upper in coöperative relation to the wipers with the bottom of a sole on the last above the plane of the active face of the wipers, mechanism automatically operative to advance the wipers to engage the upper and relatively to move the wipers and last vertically to upwipe and conform the upper and subsequently to advance and retract the wipers over the sole a plurality of times without backing the wipers off the sole between the first advance and last retraction of the wipers, an end clamping member constructed and operative in time relation to embrace and conform the shoe upper at the end of the last to the side of the last adjacent to the bottom of the last during the period of the plurality of wiping actions, and means operative to exert upper compacting pressure against the wipers perpendicularly to the plane of the sole during each advancing movement of the wipers and operative to relieve said pressure during each retracting movement of the wipers.

80. In a machine of the class described, the combination of end-embracing wipers, last supporting means movable to position a supported last with its shoe upper in cooperative relation to the wipers and with the sole on the last bottom above the plane of the active face of the wipers, and means organized bodily to advance the wipers lengthwise of the last into contact with the shoe upper below the plane of the shoe sole and to continue said advance to cause said wipers to climb up the side over the last to the plane of the sole and to advance over the margin of the sole with downward compacting pressure, said means including a wiper carrier constructed to yield upwardly with the wipers through pressure of the edge of the upper and sole against the edge face of the wipers as the carrier and wipers continue to advance.

81. In a machine of the class described, the combination of end-embracing wipers, last supporting means movable to position a supported last with its shoe upper in coöperative relation to the wipers and with the sole on the last bottom above the plane of the active face of the wipers, and mechanism automatically operative to advance the wipers into contact with the side of the shoe upper below the plane of the shoe sole and to continue to advance the wipers after they have engaged the shoe, said mechanism including wiper-carrying means mounted for bodily forward movement with the wipers to advance the wipers and constructed to yield upwardly with the wipers against spring pressure in response to pressure of the upper and sole against the edge face of the wipers as they continue their advance to tension the wipers downwardly against the edge of the upper and sole.

82. In a machine of the class described, the combination of pivoted end wipers, last supporting means movable to position a supported last with its shoe upper in coöperative relation to the wipers and with the sole on the bottom of the last above the plane of the active face of the wipers, and power operated mechanism automatically operative to close the wipers against the side of the upper below the plane of the sole and to cause the wipers to climb up over the edge of the sole and in time relation bodily to reciprocate the wipers over the sole and coincidently to swing the wipers inwardly and outwardly, said mechanism including wiper-carrying means mounted for bodily forward movement and arranged for upwardly yielding movement with the wipers in response to pressure of the upper and sole against the edge face of the wipers and having yielding connections in the wiper reciprocating and swinging means.

83. In a machine of the class described, the combination of a movable wiper head, carrying members mounted for rotative movement upon said head, wiper plates carried by and movable with said members and having formed wiping edges to embrace the end of a shoe upon a last, racks and pinions to impart rotative movement to said carrying members, said racks being yieldingly held against longitudinal movement, and means for reciprocating the wiper head bodily to move the wiper plates forwardly and backwardly and to impart opening and closing movements to the plates through said racks.

84. A machine of the class described, having in combination, a movable wiper head, carrying members mounted for rotative movement upon said head, wiper plates having formed wiping edges to embrace the end of a shoe upon a last, racks and pinions to impart rotative movement to said carrying members, said racks being yieldingly and adjustably held against longitudinal movement relatively to the wiper head, and means for reciprocating the head bodily to move the wiper plates forwardly and backwardly and to impart opening and closing movements to the wiper plates through said racks.

85. A machine of the class described, having in combination, a movable wiper head, a stationary support for said head, carrying members mounted upon said head for swinging movement thereon, end embracing wiper plates mounted on said carrying members to turn therewith, a rack and pinion for operating each carrying member, said racks being adjustably connected to said stationary support with means to permit said racks to move lengthwise with said wiper head when substantial resistance is offered to the closing of said wiper plates as the head is moved forwardly, and means for moving said head toward and from the end of a last.

86. In a machine of the class described, in combination, a flexible last and shoe upper embracing member, and means for supporting and operating said embracing member including a series of pressure members extending longitudinally of the flexible member, a common carrier for said pressure members, means for bodily moving said carrier toward the side of an embraced last, and means independently to adjust the pressure members toward and from the last to conform the flexible member to the side of the last and shoe lengthwise of the last.

87. In a machine of the class described, the combination of a last and shoe support, a flexible last and shoe upper embracing member, and means for supporting and operating said member including a carrier member, means arranged to move said carrier member toward a last to force the flexible member into last conforming contact with an upper at the side of the last, and a series of pressure members positioned upon the carrier member and adjustable relatively to the carrier member toward and from the last.

88. In a machine of the class described, the combination with a flexible member for embracing the sides of a shoe upper at the end of its last, carrier members to which the flexible member is connected for closing said member upon the upper at the end of the last, and a series of pressure members supported by each carrier member and attached to the flexible member, the pressure members of each series being independently adjustable relatively to their carrier member to adjust the flexible member independently of the movements of said carrier members.

89. An end lasting mechanism having, in combination, a last support, a heel embracing band independently of movement of the last support, means for closing the band, a pressure member at each end of the band formed to apply pressure to the upper and lower parts of the band and mounted to turn about a horizontal pivot and screws adjustable to vary the pressure applied through said members.

90. An end lasting mechanism having, in combination, means to support a last and shoe upper in position for lasting one end thereof, coöperating pivoted end wiper plates arranged to wipe a shoe upper over the end of its last, and means for closing said plates over the bottom of a supported last including independently closing connections for said plates constructed and arranged to permit simultaneous swinging movement of said plates in the same direction about the end of a last automatically to adjust said wipers relatively to the median line of said end of the last.

91. An end lasting mechanism having, in combination, means to support a last with a shoe upper thereon in position for lasting one end thereof, pivoted end wipers, and power operated means for closing said wipers over the bottom of a supported last including independent connections constructed and arranged to permit said wipers automatically to swing about the end of the supported last simultaneously and in the same direction to adjust the wipers relatively to the median line of said end.

92. An end lasting mechanism having, in combination, means to support a last with a shoe upper thereon in position for lasting one end thereof, pivoted end wipers, and means to close said wipers over the end of a supported last including independent yielding operating connections to said wipers arranged to permit swinging of said wipers simultaneously about the end of the last in the same direction to adjust them relatively to the median line of said end of the last, responsively to greater resistance offered to closing over of the wipers at one side of the last than at the other.

93. An end lasting mechanism having, in combination, means to support a last and shoe upper in position for lasting an end thereof, pivoted end wipers, carriers for said wipers, and means to operate said carriers to close said wipers over the end of a supported last, said means including independent operating connections to each of said carriers constructed and arranged to permit pressure against a wiper carrier at one side of an improperly positioned last end automatically to swing said carrier about said last end in the same direction as the other carrier to adjust the wipers relatively to the median line of said end.

94. An end lasting mechanism having, in combination, means to support a last and shoe upper in position for lasting one end thereof, pivoted end wipers, carriers for said wipers mounted for swinging movement to close and open said wipers, and means to operate said carriers to close said wipers over the bottom of the last, said operating means including independent yielding wiper closing connections for each carrier arranged to permit unequal pressures against the closing wipers at the sides of an improperly positioned last automatically to swing the carrier at one side of the last rearwardly and in the same direction as the closing carrier at the opposite side of the last to adjust their wipers relatively to the median line of said end of the last.

95. In a heel seat lasting machine, the combination with seat lasting wipers, of work supporting means comprising a vertical slide, operating means connected with the slide for moving it up and down, a work supporting rod movable endwise in the slide, and a stiff spring resting at its lower end against the slide and at its upper end engaging a collar on the work supporting rod.

96. In a heel seat lasting machine, the combination with seat lasting wipers, of work supporting means comprising a vertical slide, operating means connected with the slide for moving it up and down, a work supporting rod movable endwise in the slide, a stiff spring resting at its lower end against the slide and at its upper end engaging a collar on the work supporting rod, and operating means for the wipers and said slide organized to move said parts in time relation.

97. In a heel seat lasting machine, the combination with heel seat lasting wipers, of shoe supporting means comprising a rod guided for vertical movement toward and from the wipers in approximately the vertical axis of the last hole, power driven means for operating said wipers and rod, and a last spindle mounted on said rod for right line adjustment thereon longitudinally of the last to position the heel end of a last in proper relation to the heel wipers.

98. In a heel seat lasting machine, the combination with heel seat lasting wipers, of shoe supporting means comprising a rod guided for vertical movement toward and from the wipers in approximately the vertical axis of the last hole, and a last spindle mounted on said rod for right line adjustment thereon longitudinally of the last to position the heel end of a last in proper relation to the heel wipers, said last spindle comprising a supporting member and a last pin mounted thereon to yield against the pressure of the last.

99. In a heel seat lasting machine, the combination with heel seat lasting wipers, of last supporting means comprising a rod guided for vertical movement in a fixed path, and a last spindle mounted on the head of the rod and having a forwardly and backwardly tipping and downwardly yielding last pin, combined with means for adjusting the spindle forwardly and backwardly on the rod to shift the last pin pivot forwardly or backwardly with relation to the line of vertical pressure exerted on the heel seat by the heel seat wipers.

100. In a heel seat lasting machine, the combination with seat lasting wipers, of shoe supporting means movable to apply pressure between the last and the wipers, said supporting means including a pivotally mounted last pin, and adjusting means for causing the last pin to tip backwardly in response to such pressure.

101. In a heel seat lasting machine, the combination with seat lasting wipers and a heel embracing band, of work supporting means including a vertically movable rod, a last pin mounted on the rod for forward and backward tipping movement, and means for adjusting the last pin forwardly and backwardly with relation to the rod to locate the pivotal support for the last pin so that the pin will automatically tip backwardly in the holes of lasts of different sizes or having differently located pin holes in response to vertical pressure of the last against the wipers.

102. In a heel seat lasting machine, the combination with seat lasting wipers and a heel embracing band, of vertically movable work supporting means including a last pin pivoted to swing forwardly and backwardly, a device for holding the last pin against forward swinging movement, and means operative automatically to disengage said device when the work support is depressed and to engage the device and cause it to hold the last pin against forward movement when the work support is upraised.

103. In a heel seat lasting machine, the combination with seat lasting wipers and a heel embracing band, of vertically movable work supporting means including a last pin mounted to tip forwardly and backwardly, means for elevating and depressing the work support, and means operating automatically to tip the last pin backwardly and force the last into the heel band when the support is elevated and to free the last pin for forward tipping movement when the work support is depressed to facilitate the removal and application of the work.

104. In a heel seat lasting machine, the combination with seat lasting wipers and a heel embracing band, of vertically movable work supporting means including a last pin pivoted to swing forwardly and backwardly, said pin having a ratchet arm rigid with its pivot, backwardly faced ratchet teeth on said arm, a pawl yieldingly pressed toward said ratchet teeth to hold the last pin in its backwardly tipped position, and means for automatically disengaging the pawl and holding it out of engagement with the ratchet teeth when the work support occupies its depressed position.

105. In a heel seat lasting machine, the combination with seat lasting wipers and a heel embracing band, of vertically movable work supporting means including a last pin pivoted to swing forwardly and backwardly, a ratchet arm rigid with the last pin pivot, a swinging pawl carrier on the last pin pivot, a pawl on the carrier, and operating means organized to depress the work support for removal and application of the work and simultaneously to disengage the pawl from the ratchet to permit the last pin to be tipped forwardly and thereafter to elevate the work support and free the pawl to engage the ratchet for holding the last pin in the backwardly tipped position to which the workman moves it, and subsequently to swing the pawl carrier in the direction for forcibly tipping the last pin farther backwardly and thrusting the last into the heel band.

106. In a heel seat lasting machine, the combination with seat lasting wipers and a heel embracing band, of vertically movable work supporting means including a last pin pivoted to swing forwardly and backwardly, and operating means permitting the last pin to be tipped forwardly and backwardly for application and removal of the shoe and organized to effect an upward movement of the work support preparatory to the seat lasting operation and a forcible backward tipping of the last pin for pressing the last hard back into the heel band.

107. In a heel seat lasting machine, the combination with seat lasting wipers, the plane of operation of which is predetermined within limits, of a hold down arranged to engage the heel seat of the shoe, a last pin, and operating mechanism yieldingly connected with the last pin and unyieldingly connected with the hold down and organized to move the hold down and the last pin each toward the other from shoe receiving positions and present the heel seat faces of different sized shoes in predetermined relation to the plane of operation of the wipers.

108. In a heel seat lasting machine, the combination with seat lasting wipers, of a hold down, a last pin, a single slide yieldingly connected to the last pin for elevating the last pin and unyieldingly connected to the hold down and means for imparting a predetermined movement to the slide for causing the hold down to determine the plane of the heel seat invariably while the last pin yieldingly clamps the shoe against the hold down.

109. In a heel seat lasting machine, the combination with seat lasting wipers, of a vertically movable last pin, a slide in which the last pin is yieldingly mounted, bars mounted for vertical sliding movement at opposite sides of the machine and connected at their upper ends by a cross head, a hold down mounted on the cross head to engage the shoe substantially over the last pin, lever connections between the slide and the bars arranged to force the hold down downwardly simultaneously with the elevation of the last pin, and means for imparting a predetermined movement to the slide in time relation to the operative movement of the seat lasting wipers.

110. In a heel seat lasting machine, the combination with seat lasting wipers, of shoe positioning mechanism comprising a last pin and a hold down, and operating mechanism for advancing and retracting the wipers and for causing the shoe positioning mechanism to clamp the work and to impart to the work predetermined down and up movements with relation to the wipers in time relation to the closing and opening movements of the wipers with the plane of the heel seat presented initially above the plane of the wipers.

111. In a heel seat lasting machine, the combination with seat lasting wipers, of shoe positioning mechanism comprising a last pin and a hold down, and operating mechanism for closing and opening the wipers and for causing the shoe positioning mechanism to clamp the shoe and hold it with the plane of the heel seat in a predetermined relation to the plane of the wipers during an initial portion of the movement of the wipers over the heel seat and then while the wipers are positioned over the heel seat to elevate the plane of the heel seat for the operation of the wipers during a subsequent portion of their movement.

112. In a heel seat lasting machine, the combination with seat lasting wipers, of shoe positioning mechanism including an unyielding hold down and a yielding last pin, and operating mechanism for reciprocating the wipers and for relatively moving the hold down and last pin to clamp the work and present it with the plane of the heel seat in a predetermined position during an initial portion of the movement of the wipers over the heel seat and then to raise the hold down and increase the upward pressure of the shoe against the wipers during the completion of the advance of the wipers over the heel seat.

113. In a heel seat lasting machine, the combination with seat lasting wipers, of shoe positioning mechanism comprising a single vertically movable power operated slide, a last pin yieldingly connected with the slide, a hold down, and connections between the slide and the hold down by which the hold down is forced downwardly as the slide and last pin are elevated.

114. In a heel seat lasting machine, the combination with seat lasting wipers, of embracing means comprising a bracket and arms pivotally connected together and to the bracket at the rear end of the heel seat and having pressure members formed thereon to press upon the work at opposite corners of the heel for clamping the upper materials against the last at the corners of the heel, and means for swinging said arms about their pivots to effect clamping of the work.

115. In a heel seat lasting machine, the combination with seat lasting wipers, of embracing means comprising a bracket and arms pivotally connected together and to the bracket and each carrying a plurality of relatively yielding pressure members arranged to press upon the work at the sides of the heel for clamping the upper materials to the side faces of the last, and means for swinging the arms about their pivot to effect the clamping of the work in time relation with the operation of the seat lasting wipers.

116. In a heel seat lasting machine, the combination with seat lasting wipers, of embracing means comprising a bracket and arms pivotally connected together and to the bracket and each carrying a plurality of relatively yielding pressure members arranged to press upon the work at the sides of the heel for clamping the upper materials to the side faces of the last, and independently yielding means for engaging the respective arms and swinging them about their pivots for effecting clamping pressure of the pressure members against the opposite sides of the heel.

117. In a heel seat lasting machine, the combination with seat lasting wipers, of embracing means comprising a bracket and arms pivotally connected together and to the bracket and each carrying a plurality of relatively yielding pressure members arranged to press upon the work at the sides of the heel for clamping the upper materials to the side faces of the last, and power operated means for swinging the arms about their pivot and imparting to said pressure members combined inward and forward movement, said members being free to yield outwardly in the arms but compelled to move forwardly with the arms whereby to effect a forward tension of the engaged upper materials as the arms close and the pressure members yield outwardly in the arms.

118. In a heel seat lasting machine, the combination with seat lasting wipers, of means for clamping the upper materials against the side faces of the heel portion of the last, including a pressure applying member mounted to turn about a horizontal pivot and yieldingly held in position to apply clamping pressure first adjacent to the heel seat face of the shoe and then to turn and spread the area of clamping pressure downwardly along the side of the last.

119. In a heel seat lasting machine, the combination with seat lasting wipers, of a heel embracing band, swinging carriers to which the front end portions of the band are connected, and means yieldingly connecting the rear middle portion of the band with its carriers and allowing said middle rear portion of the band to spring away from its carriers as the band is opened.

120. In a power heel seat lasting machine, the combination with means for supporting a shoe in position to be operated upon, of seat lasting wipers, a wiper carrying head bodily movable lengthwise of the last, a cam, a lever, a link extending from the lever through a portion of the head, and a spring interposed between the head and a portion of the link for yieldingly transmitting the cam motion to the wiper carrying head.

121. In a power heel seat lasting machine, the combination with means for supporting a shoe in position to be operated upon, of seat lasting wipers, a wiper carrying head bodily movable lengthwise of the last, a cam, a lever, a link, a pivot pin connecting the lever and link and having a pin and slot connection with the wiper carrying head, and a spring arranged between the wiper carrying head and a portion of the link to transmit the cam motion yieldingly to the wiper carrying head and allow compression as the wiper encounters resistance and the pivot pin moves in its slot connection with the head.

122. In a power heel seat lasting machine, the combination with means for supporting a shoe in position to be operated upon, of seat lasting wipers, a wiper carrying head arranged for bodily movement forwardly and backwardly, a cam, a lever extending from the cam and having a pivotal connection with the rear end of the wiper carrying head, a link connection between the forward portion of the wiper carrying head and a fixed portion of the machine, and a spring associated with said link connection to permit the wiper carrying head to move vertically for allowing the wipers to climb over the edge of the shoe as they are advanced.

123. In a power heel seat lasting machine, the combination with end embracing wipers and means for supporting a shoe in position to be operated on, of means operating in time relation to clamp the shoe and to advance the wipers lengthwise of the shoe to engage the shoe below the plane of its sole, said wipers being mounted with capacity for limited upward movement against yielding resistance to climb up to the plane of the sole as they continue said advancing movement after thus engaging the shoe.

124. In a power heel seat lasting machine, the combination with end embracing wipers, of shoe supporting means, and power operating mechanism organized to position the shoe automatically with the plane of the heel seat elevated to a predetermined extent above the plane of the lower face of the wipers and to advance the wipers to embrace the heel below the plane of the heel seat and by continued advancing movement to climb upwardly against yielding reisistance over the edge of and on to the heel seat and gather the upper inwardly over the heel seat.

125. In a power heel seat lasting machine, the combination with end embracing wipers, of shoe supporting means, and power operating mechanism organized to position the shoe automatically with the plane of the heel seat elevated to a predetermined extent above the plane of the lower face of the wipers and to advance the wipers lengthwise of the shoe to cause them to embrace the heel slightly below the plane of the heel seat and to continue said lengthwise advance of the wipers to cause them to climb up over the edge of the heel seat against yielding resistance frictionally pulling the upper to form it to the edge of the heel seat and press it upon the margin of the heel seat.

126. In a power heel seat lasting machine, the combination with heel embracing wipers, of an unyielding hold down and a yielding last pin for positioning a shoe with the plane of its heel seat slightly above the plane of the lower face of the wipers, wiper controlling means permitting a limited vertical displacement of the wipers against yielding resistance, means for advancing the wipers and causing them to climb over the edge of the heel seat, and means for raising the hold down to allow the yielding last pin to raise the shoe and take up the vertical yield of the wipers, whereby the completion of the advance of the wipers is effected with the wipers held rigidly against upward displacement.

127. In a power heel seat lasting machine, the combination with heel embracing wipers, and shoe positioning means, of controlling and operating mechanism for said wipers and positioning means organized to cause relative lengthwise movement of the shoe and the wipers, to cause the wipers to embrace the shoe slightly below the plane of the heel seat and to continue said relative lengthwise movement to cause the wipers to climb up over the edge of the heel seat against yielding resistance and then to advance to complete the wiping action with a vertically unyielding wiping movement.

128. In a power heel seat lasting machine, the combination with seat lasting wipers and means for supporting a shoe in position to be operated upon by said wipers, of controlling and operating mechanism for said wipers organized yieldingly to move the wipers bodily lengthwise of the shoe and to close them against the upper below the plane of the heel seat and to continue said lengthwise advance to cause them to climb up and advance inwardly over the heel seat, said mechanism including means arranged to permit said wipers to yield upwardly in response to advancing pressure of the wipers against the upper and last to permit the wipers to climb up over the edge of the heel seat as they are moved lengthwise of the shoe.

129. In a power heel seat lasting machine, the combination with seat lasting wipers and means for supporting a shoe in position to be operated upon by said wipers, of wiper-carrying means bodily movable toward and lengthwise of the last, and controlling and operating mechanism for said wipers and carrying means organized yieldingly to move said carrying means lengthwise of the shoe, first, to engage the wipers with the upper below the plane of the heel seat and then, by continued lengthwise movement, to cause the wipers to climb up over the edge of the heel seat and to advance inwardly, said mechanism including means to permit yielding upward movement of the carrying means responsive to advancing pressure of the wipers against the upper to permit the wipers to climb up over the edge of the heel seat.

130. In a machine of the class described, the combination with a shoe end embracing band, of means for applying pressure to said band to force it against a shoe, said pressure applying means being mounted to swing in response to resistance of the shoe about an axis extending in substantially parallel relation to the plane of the shoe bottom to permit the band to conform to the contour of the shoe, and spring means for determining a normal position of said pressure applying means with respect to movement about said axis.

131. In a machine of the class described, the combination with a shoe end embracing band, of members arranged to apply pressure to said band at opposite sides of a shoe to force the band against the shoe, said members being mounted to swing in response to resistance of the shoe about axes extending lengthwise of the shoe to permit the band to conform to the contour of the shoe, and spring means for determining a normal position of said members with respect to movement about said axes.

132. In a machine of the class described, the combination with a shoe end embracing band, of members for applying pressure to said band at opposite sides of a shoe, said members being mounted to swing in response to resistance of the shoe about axes extending lengthwise of the shoe, and spring means for positioning said members in such relation to the shoe as to cause the band to apply its pressure initially adjacent to the plane of the shoe bottom while permitting the band to be closed inward subsequently against other portions of the lateral surface of the shoe.

133. In a machine of the class described, the combination with a shoe end embracing band, of yielding means tending to position said band for engagement with the lateral periphery of a shoe initially adjacent to the edge of the shoe bottom while permitting the band subsequently to be forced inward into conforming relation to other portions of the lateral periphery of the shoe.

134. In a machine of the class described, shoe clamping means arranged to press upon the lateral periphery of a shoe and comprising a member mounted to tip in response to resistance of the shoe about an axis extending in substantially parallel relation to the plane of the shoe bottom to conform to the heightwise contour of the shoe, spring means arranged to oppose yielding resistance to tipping movement of said member, and an adjustable stop coöperating with said spring means to determine different normal positions of the member.

135. In a machine of the class described, shoe clamping means arranged to press upon the lateral periphery of a shoe and comprising a flexible end embracing band, a band supporting member mounted to tip vertically of the shoe and also to yield bodily relatively to the shoe, and spring means tending to resist said tipping and bodily yielding movements of the member.

136. In a machine of the class described, shoe clamping means comprising a flexible end embracing band, a band supporting member for supplying pressure on the lateral periphery of a shoe, said member being mounted to yield bodily in a direction transverse to the surface on which said pressure is applied and also to swing about an axis extending longitudinally of said surface, and spring means tending to resist said bodily yielding and swinging movements of the member.

137. In a machine of the class described, the combination with a shoe end embracing band, of pressure applying means movable laterally of the shoe to press said band inwardly against the shoe from the front end of the band rearwardly, and means movable lengthwise of the shoe in wedging engagement with said pressure applying means for applying said pressure.

138. In a machine of the class described, shoe clamping means comprising members mounted for movement laterally of a shoe and having wedge surfaces inclined to the lengthwise dimension of the shoe and directed outwardly and forwardly at the respective sides of the shoe, and means movable lengthwise of the shoe in engagement with said surfaces to force said members inwardly toward the shoe.

139. In a machine of the class described, shoe clamping means comprising members each mounted to swing laterally of the shoe about an axis at the end of the shoe and having a wedge surface inclined to the lengthwise dimension of the shoe, and means movable lengthwise of the shoe in engagement with said wedge surfaces for swinging said members inwardly toward the shoe.

140. In a machine of the class described, shoe clamping means comprising members mounted for movement laterally of a shoe into clamping relation to the shoe, thrust members movable lengthwise of the shoe for operating said clamping members, and mechanism comprising independently adjustable spring connections to the respective thrust members for operating said members.

141. In a machine of the class described, shoe clamping means comprising members mounted for movement laterally of a shoe into clamping relation to the shoe, thrust members movable lengthwise of the shoe for operating said clamping members, and a cross bar connected to said thrust members for operating them, the connections between said cross bar and thrust members comprising springs separately adjustable for varying the relative clamping pressures at the opposite sides of the shoe.

142. In a machine of the class described, the combination with end lasting means, of shoe positioning means movable in a direction transverse to the plane of the shoe bottom to position the shoe for the lasting operation, said shoe positioning means being movable also in a direction lengthwise of the shoe, and mechanism controlled by said first named movement of the positioning means for holding said means against movement in a direction lengthwise of the shoe.

143. In a machine of the class described, the combination with end lasting means, of shoe positioning means movable in a direction transverse to the plane of the shoe bottom to position the shoe for the lasting operation, said shoe positioning means including a last supporting spindle mounted to tip in a direction lengthwise of the shoe, and mechanism controlled by the movement of said shoe positioning means for holding said spindle against tipping movement.

144. In a machine of the class described, the combination with heel seat lasting means, of a heel end abutment, shoe positioning means movable in a direction transverse to the plane of the shoe bottom to position the shoe relatively to the lasting means, said shoe positioning means being movable also backwardly to thrust the heel end of the shoe against said abutment, and mechanism controlled by said first named movement of the shoe positioning means for holding said means against forward movement.

145. In a machine of the class described, the combination with end lasting means, of shoe positioning means, mechanism for moving said shoe positioning means in a direction transverse to the plane of the shoe bottom to position the shoe for the lasting operation, mechanism for imparting to said shoe also a lengthwise positioning movement comprising parts normally disconnected from each other, and means controlled by said first named movement of the shoe positioning means for connecting said parts to render said mechanism operative.

146. In a machine of the class described, the combination with end lasting means, of shoe positioning means, mechanism for moving said shoe positioning means in a direction transverse to the plane of the shoe bottom to position the shoe relatively to the lasting means, said shoe positioning means including a last supporting spindle mounted for tipping movement in directions lengthwise of the shoe, and pawl and ratchet mechanism connected to said spindle for tipping it in time relation to said first named movement of the shoe positioning means.

147. In a machine of the class described, the combination with end lasting means, of shoe positioning means, mechanism for moving said shoe positioning means in a direction transverse to the plane of the shoe bottom to position the shoe relatively to the lasting means, said shoe positioning means including a last supporting spindle mounted for tipping movement in directions lengthwise of the shoe, and mechanism controlled by said first named movement of the shoe positioning means for tipping said spindle in one direction and for holding it against reverse tipping movement.

148. In a machine of the class described, the combination with heel seat lasting means, of a heel end abutment, shoe positioning means comprising a shoe support mounted to tip in directions lengthwise of the shoe, and power operated means comprising a ratchet and a pawl mounted to swing about the axis of said support for tipping the shoe against said abutment.

149. In a machine of the class described, the combination with end lasting means, of a shoe end abutment, and shoe positioning means comprising a shoe support mounted to tip in a direction lengthwise of the shoe to position the end of the shoe against said abutment, and normally free for tipping movement in response to pressure of the operator's hand upon the shoe, said shoe support being adjustable bodily in directions lengthwise of the shoe to determine the extent of tipping movement of the shoe and the consequent angular relation of the plane of the shoe bottom to the lasting means.

150. In a machine of the class described, the combination with shoe positioning means, of a member for laying the margin of the upper inwardly over the shoe bottom, operating means mounted for movement inwardly toward the edge of the shoe bottom to force said member over the shoe bottom, means constructed and arranged to permit a relative yield between said member and operating means in the direction of said inward movement, said member being mounted also for movement in a direction transverse to the plane of the shoe bottom in response to resistance of the shoe materials, and independent yielding means for controlling said last named movement of the member.

151. In a machine of the class described, the combination with shoe positioning means, of a wiper for laying the margin of the upper inwardly over the shoe bottom, operating means connected to said wiper and mounted for movement toward the lateral periphery of the shoe to force the wiper inwardly, the connection between said operating means and the wiper comprising a spring arranged to transmit movement to the wiper and to yield in response to resistance to inward movement of the wiper, said wiper being mounted also for movement in a direction transverse to the plane of the shoe bottom in response to resistance of the shoe materials, and a second spring for controlling said last named movement of the wiper.

152. In a machine of the class described, the combination with shoe positioning means, of a wiper mounted for movement inwardly over the margin of the shoe bottom and also for movement upwardly from said margin, wiper operating means mounted for movement toward the lateral periphery of the shoe, and independent yielding means between said wiper and operating means for controlling said different movements of the wiper.

153. In a machine of the class described, the combination with shoe positioning means, of a wiper mounted for movement inwardly over the shoe bottom and also to tip in directions transverse to the plane of the shoe bottom, wiper operating means mounted for movement toward the edge of the shoe bottom, spring means between said operating means and the wiper and through which said inward movement is imparted to the wiper, and other spring means tending to tip the wiper in a direction to press the shoe materials upon the margin of the shoe bottom while permitting the wiper to yield in response to resistance of said materials.

154. In a machine of the class described, the combination with shoe positioning means, of end embracing wipers mounted for movement lengthwise of the shoe and also for yielding movement in a direction transverse to the plane of the shoe bottom, spring means through which said lengthwise movement is imparted to the wipers yieldingly, and other spring means for controlling said transverse yield of the wipers.

155. In a machine of the class described, the combination with shoe positioning means, of end embracing wipers, operating means for moving said wipers lengthwise of the shoe, said wipers being mounted on said operating means to swing bodily and relatively to said means in a direction transverse to the plane of the shoe bottom about an axis located beyond the end of the shoe, and means tending to swing the wipers in a direction to cause them to press the upper materials upon the shoe bottom while permitting them to yield in response to resistance of said materials.

156. In a machine of the class described, the combination with shoe positioning means, of end embracing wipers, operating means for moving said wipers lengthwise of the shoe, said wipers being pivotally connected to said operating means to swing bodily about an axis extending laterally of the shoe beyond the end of the shoe and extending also in substantially parallel relation to the plane of the shoe bottom, and spring means tending to swing said wipers in a direction to cause them to press the upper materials upon the shoe bottom while permitting them to yield in response to resistance of said materials.

157. In a machine of the class described, the combination with shoe positioning means, of end embracing wipers, and operating means comprising substantially parallel arms arranged to move said wipers lengthwise of the shoe while tending to maintain them in substantially uniform angular relation to the plane of the shoe bottom, said wipers being mounted to yield bodily away from the plane of the shoe bottom in response to resistance of the shoe materials during their operative movement.

158. In a machine of the class described, the combination with shoe positioning means, of end embracing wipers, operating means comprising substantially parallel arms arranged to move said wipers lengthwise of the shoe while tending to maintain them in substantially uniform angular relation to the plane of the shoe bottom, said wipers being pivotally mounted to permit them to swing bodily in response to resistance of the shoe materials during their operative movement about an axis located beyond the end of the shoe and extending in substantially parallel relation to the plane of the shoe bottom, and spring means tending to resist said swinging movement of the wipers.

159. In a machine of the class described, the combination with shoe positioning means, of upper shaping mechanism comprising end embracing wipers having wiping edges curved in substantial conformity to the lengthwise contour of the edge of the shoe bottom, means for effecting relative movement of said shoe positioning means and wipers in a direction lengthwise of the shoe in such relation as to cause the wipers to engage the shoe initially on its lateral periphery outside of the plane of the shoe bottom and subsequently to wipe the upper inwardly over the shoe bottom, said shoe positioning means and upper shaping mechanism being constructed and arranged to permit a relative yield between the shoe and the wipers in a direction transverse to the plane of the shoe bottom in response to wedging action of the shoe against the wipers to cause the wipers to wipe the upper over the edge of the shoe bottom prior to their wiping action over the shoe bottom.

160. In a machine of the class described, the combination with shoe positioning means, of end embracing wipers having wiping edges curved in substantial conformity to the lengthwise contour of the edge of the shoe bottom, spring means against which said wipers are yieldable in a direction transverse to the plane of the shoe bottom, and means for closing said wipers against the lateral periphery of the shoe and by relative movement of the shoe and the wipers causing them to be forced by wedging action of the shoe over the edge of the shoe bottom against resistance of said spring means prior to their continued inward closing movement.

161. In a machine of the class described, the combination with shoe positioning means, of end embracing wipers having wiping edges curved in substantial conformity to the lengthwise contour of the edge of the shoe bottom, spring means against which said wipers may yield in a direction transverse to the plane of the shoe bottom, and operating means for moving said wipers yieldingly to force them against the lateral periphery of the shoe at the end and along the opposite sides of the end portion of the shoe and for increasing the operating pressure to cause the wipers to be wedged by the shoe toward the plane of the shoe bottom against the resistance of said spring means while continuing in close embracing relation to the shoe.

162. In a machine of the class described, the combination with shoe positioning means, of end embracing wipers, a wiper support movable to carry the wipers lengthwise of the shoe, and means arranged to be operated by said movement of the wiper support for closing the wipers inward laterally of the shoe during their movement lengthwise of the shoe, said closing means being yieldable in response to resistance encountered by the wipers to permit the wipers to continue their movement lengthwise of the shoe without closing.

163. In a machine of the class described, the combination with shoe positioning means, of end embracing wipers, a wiper support movable to carry the wipers lengthwise of the shoe, and independent connections to the respective wipers arranged to be operated by said movement of the wiper support for closing the wipers inward laterally of the shoe, said connections being independently yieldable in response to the resistance encountered by the wipers.

164. In a machine of the class described, the combination with shoe positioning means, of end embracing wipers, a wiper support movable to carry the wipers lengthwise of the shoe, means operated by said movement of the wiper support for closing the wipers inward laterally of the shoe comprising parts movable with said support and coöperating parts normally held against movement with the support as the wipers are closed, and yielding means for controlling said last named parts to permit them to move with the wiper support in response to abnormal resistance encountered by the wipers.

165. In a machine of the class described, the combination with shoe positioning means, of end embracing wipers, a wiper support movable to carry the wipers lengthwise of the shoe, means for closing the wipers inward laterally of the shoe comprising pinions carried by said wiper support and racks engaging said pinions and normally held against movement with said support as the wipers are closed, and spring means arranged to permit said racks to move with the wiper support in response to predetermined resistance to closing movement of said wipers.

166. In a machine of the class described, the combination with shoe positioning means, of end embracing wipers, and mechanisms operative each independently of the other through relative movement of the shoe and the wipers lengthwise of the shoe for closing the respective wipers inward laterally of the shoe, said mechanisms being adjustable each independently of the other to determine the initial positions of the wipers.

167. In a machine of the class described, the combination with shoe positioning means, of end embracing wipers, a wiper support mounted for movement lengthwise of the shoe, and independent wiper closing connections arranged to be operated by said movement of the support for closing the respective wipers inward laterally of the shoe, said connections being adjustable each independently of the other to determine the initial positions of said wipers.

168. In a machine of the class described, the combination with shoe positioning means, of end embracing wipers, a wiper support movable to carry the wipers lengthwise of the shoe, and means operated by said movement of the wiper support for closing the wipers inward laterally of the shoe during their movement lengthwise of the shoe comprising parts movable with said support and coöperating parts normally held against movement with the support, said last named parts being adjustable relatively to said support to determine the initial positions of the wipers.

169. In a machine of the class described, the combination with shoe positioning means, of end embracing wipers, a wiper support mounted for movement lengthwise of the shoe, means for closing said wipers inward laterally of the shoe comprising pinions carried by said support and racks engaging said pinions and normally held against movement with the wiper support, and means for adjusting said racks each independently of the other to determine the initial positions of the respective wipers.

170. In a machine of the class described, the combination with end embracing wipers, of means for relatively positioning a shoe and said wipers to cause the wipers to engage the lateral periphery of the shoe and then to be forced across the edge of the shoe bottom by wedging action of the shoe prior to their inward wiping movement over the shoe bottom, and power means automatically operative to impart to said wipers a plurality of reciprocatory wiping movements while maintaining them continuously over the shoe bottom.

171. In a machine of the class described, the combination with overlaying means, of shoe positioning means comprising a hold-down and a coöperating clamping member for engaging the work on the opposite side from said hold-down, a spring for forcing said member toward the hold-down, and means for operating the hold-down while said overlaying means is positioned over the shoe bottom to permit the work to be forced against the overlaying means by the action of said spring.

172. In a machine of the class described, the combination with a wiper and means for operating it to wipe the margin of an upper inwardly over the bottom of a last, of a hold-down for engaging the sole of the shoe on the bottom of the last, spring means tending to force the work toward said hold-down, and means for causing the hold-down to move after the wiper has been advanced inwardly across the edge of the shoe bottom to permit said spring means to force the work against the wiper.

In testimony whereof I affix my signature in presence of two witnesses.

CHARLES F. PYM.

Witnesses:
ANNA M. DORR,
LEWIS E. FLANDERS.